(12) United States Patent
Okazaki et al.

(10) Patent No.: US 11,819,749 B2
(45) Date of Patent: Nov. 21, 2023

(54) GOLF CLUB FITTING APPARATUS

(71) Applicant: SUMITOMO RUBBER INDUSTRIES, LTD., Kobe (JP)

(72) Inventors: Kousuke Okazaki, Kobe (JP); Masahiko Ueda, Kobe (JP); Yuto Nakamura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 166 days.

(21) Appl. No.: 17/027,357

(22) Filed: Sep. 21, 2020

(65) Prior Publication Data
US 2021/0101066 A1   Apr. 8, 2021

(30) Foreign Application Priority Data
Oct. 4, 2019   (JP) .................................. 2019-183460

(51) Int. Cl.
   *A63B 69/36*   (2006.01)
   *A63B 24/00*   (2006.01)

(52) U.S. Cl.
   CPC .......... *A63B 69/36* (2013.01); *A63B 24/0006* (2013.01); *A63B 2220/05* (2013.01);
   (Continued)

(58) Field of Classification Search
   CPC . A63B 69/36; A63B 24/0006; A63B 2220/05; A63B 2220/20; A63B 2220/34; A63B 2220/40; A63B 2220/62; A63B 2220/807; A63B 2220/833; A63B 2225/50; A63B 24/0003; A63B 60/42;
   (Continued)

(56) References Cited

U.S. PATENT DOCUMENTS

| 3,792,863 A * | 2/1974 | Evans ................ A63B 69/3632 |
| | | 340/870.18 |
| 2003/0008731 A1 * | 1/2003 | Anderson .............. A63B 60/42 |
| | | 473/407 |

(Continued)

FOREIGN PATENT DOCUMENTS

| JP | 2005-21329 A | 1/2005 |
| JP | 2017-170105 A | 9/2017 |

OTHER PUBLICATIONS

Japanese Notice of Reasons for Refusal for Japanese Application No. 2019-183460, dated Jun. 30, 2023, with English translation.

*Primary Examiner* — Jeffrey S Vanderveen
(74) *Attorney, Agent, or Firm* — Birch, Stewart, Kolasch & Birch, LLP

(57) ABSTRACT

Provided is a fitting apparatus configured to acquire measurement data obtained by measuring a swing action of a test club by a golfer, calculate one or more first indices representing an amount of change in an openness of a face surface of a head included in the test club at a time of the swing action based on the measurement data, calculate one or more second indices representing a characteristic of the swing action based on the measurement data, select a balance of a golf club suitable for the golfer, according to the one or more first indices, select at least one of a weight and a moment of inertia of a golf club suitable for the golfer, according to the one or more second indices, and select a golf club having the balance and the at least one of the weight and the moment of inertia.

20 Claims, 16 Drawing Sheets

(52) U.S. Cl.
CPC ....... *A63B 2220/20* (2013.01); *A63B 2220/34* (2013.01); *A63B 2220/40* (2013.01); *A63B 2220/62* (2013.01); *A63B 2220/807* (2013.01); *A63B 2220/833* (2013.01); *A63B 2225/50* (2013.01)

(58) Field of Classification Search
CPC ................ A63B 60/46; A63B 71/0622; A63B 2071/0675; A63B 2071/0694; A63B 2209/00; A63B 2220/54; A63B 2220/806; A63B 2220/89; G06V 40/23
See application file for complete search history.

(56) References Cited

U.S. PATENT DOCUMENTS

| | | | |
|---|---|---|---|
| 2011/0207560 A1* | 8/2011 | Wright | A63B 24/0003 473/407 |
| 2012/0196692 A1* | 8/2012 | Beck | A63B 60/00 709/221 |
| 2017/0065866 A1 | 3/2017 | Okazaki et al. | |
| 2018/0169471 A1* | 6/2018 | Kondo | A63B 69/3605 |

* cited by examiner

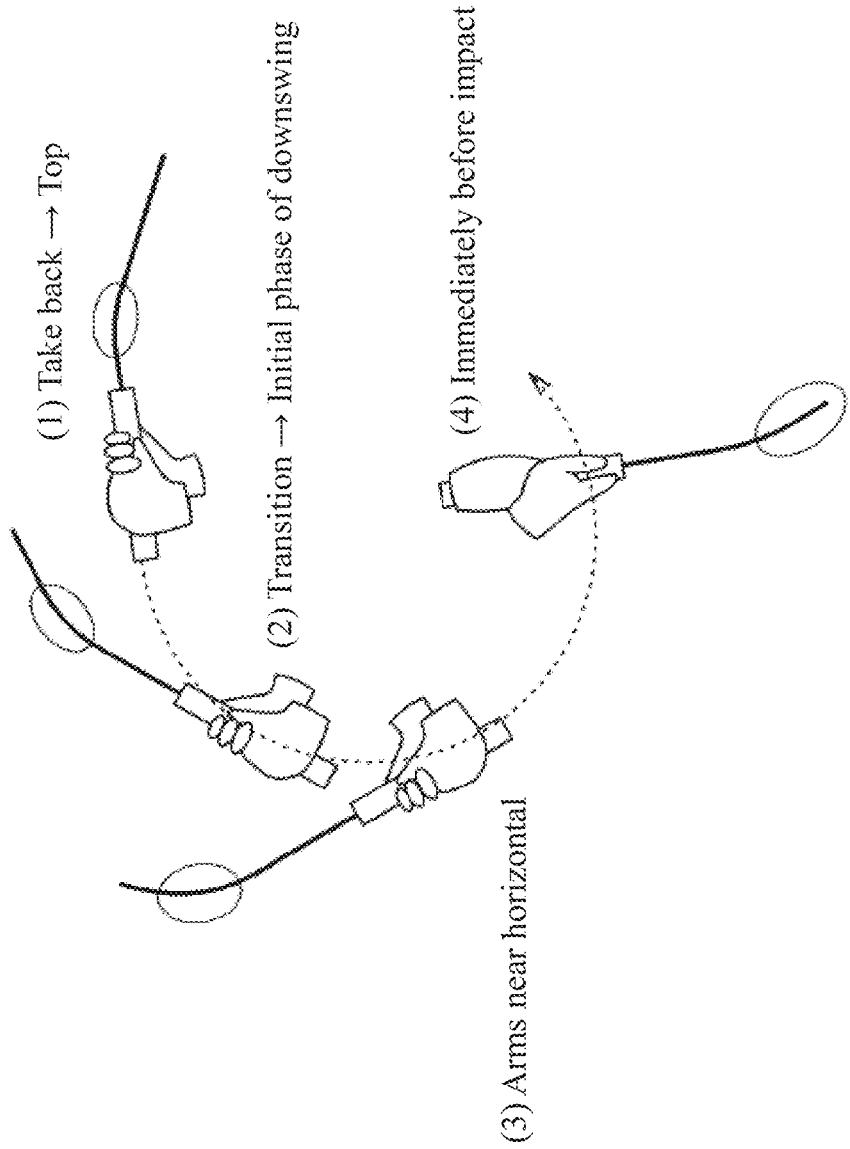

Fig.15

| Golfer | Change amount $C_{13}$ of face angle (deg) | Suitable club |
|---|---|---|
| T1 | 5.878 | Normal |
| T2 | 7.12 | Light balance |
| T3 | 6.576 | Normal |
| T4 | 7.156 | Light balance |
| T5 | 8.96 | Light balance |
| T6 | 6.57 | Light balance |
| T7 | 6.054 | Light balance |
| T8 | 5.454 | Normal |
| T9 | 9.44 | Light balance |
| T10 | 7.22 | Light balance |
| T11 | 5.542 | Normal |
| T12 | 7.654 | Light balance |
| T13 | 7.8 | Light balance |
| T14 | 7.09 | Light balance |
| T15 | 8.35 | Light balance |
| T16 | 7.455 | Light balance |
| T17 | 6.42 | Light balance |
| T18 | 5.186 | Normal |
| T19 | 7.97 | Light balance |
| T20 | 6.584 | Normal |
| T21 | 4.856 | Normal |
| T22 | 7.77 | Light balance |
| T23 | 6.0025 | Normal |
| T24 | 6.872 | Light balance |
| T25 | 4.8825 | Normal |
| T26 | 6.42 | Light balance |
| T27 | 8.172 | Light balance |

GOLF CLUB FITTING APPARATUS

CROSS REFERENCE TO RELATED APPLICATION

This application claims a priority to Japanese Patent Application No. 2019-183460 filed on Oct. 4, 2019, which is hereby incorporated by reference in its entirety.

FIELD OF INVENTION

The present invention relates to a fitting apparatus, method and program for selecting a golf club suitable for a golfer.

BACKGROUND

Conventionally, various fitting methods that involve getting a golfer to take practice hits with test clubs, measuring the action thereof with a measurement device, and selecting a golf club suitable for the golfer based on the measurement data obtained at that time have been proposed. JP 2017-170105A discloses a fitting method that involves calculating indices such as the weight, moment of inertia and shaft stiffness of a golf club suitable for a golfer, based on measurement data, and recommending a golf club that matches these indices to the golfer. According to a fitting method such as the above, it becomes possible to provide golf clubs having specifications suitable for different individuals, and an improvement in shots such as increased distance and reduced lateral deflection is expected.

SUMMARY OF THE INVENTION

Incidentally, one specification of a golf club is an item called "balance". Balance, also known as swing weight, is an index representing how heavy the head feels when a golf club is swung, and influences the swing feel. Generally, balance is represented by a combination of the letters A to E and the numbers 0 to 9, such as "D0", with "heavier" being signified in order of A to E, and "heavier" also being signified as the number becomes larger. The balance being "heavy" means that the center of gravity of the golf club is closer to the head and that the resistance of the head will be more noticeable when the golf club is swung, and, accordingly, could mean that the golf club is harder to swing. Conversely, the balance being "light" means that the center of gravity of the golf club is closer to the grip and that the resistance of the head will be less noticeable when the golf club is swung, and, accordingly, could mean that the golf club is easier to swing.

With regard to balance such as described above, every golfer is different, with some people being better suited to a lighter balance, while others are better suited to a heavier balance. Therefore, a further improvement in shots is expected if golf clubs with a balance suitable for individual golfers can be provided. However, a method of specifying the balance suitable for a golfer has not been proposed heretofore, and, in this regard, it has not always been possible to select golf clubs that were truly suitable for golfers.

An object of the present invention is to provide a fitting apparatus, method and program that enable a golf club having a balance suitable for a golfer to be selected.

A fitting apparatus according to a first aspect includes an acquisition unit configured to acquire measurement data obtained by measuring a swing action of a test club by a golfer with a measurement device, a calculation unit configured to calculate one or more first indices representing an amount of change in an openness of a face surface of a head included in the test club at a time of the swing action, and calculate one or more second indices representing a characteristic of the swing action, different from the one or more first indices, based on the measurement data, and a selection unit configured to select a balance of a golf club suitable for the golfer, according to the one or more first indices, select at least one of a weight and a moment of inertia of a golf club suitable for the golfer, according to the one or more second indices, and select a golf club matching a condition of the balance and a condition of the at least one of the weight and the moment of inertia.

A fitting apparatus according to a second aspect is the fitting apparatus according to the first aspect, in which the calculation unit calculates the one or more first indices, based on angular velocity data, included in the measurement data, about an axis approximately parallel to a shaft of the test club.

A fitting apparatus according to a third aspect is the fitting apparatus according to the first or second aspect, in which the calculation unit calculates the one or more first indices, based on angular velocity data, included in the measurement data, about an axis approximately parallel to a toe-heel direction of the test club.

A fitting apparatus according to a fourth aspect is the fitting apparatus according to the second or third aspect, in which the angular velocity data is data measured by an angular velocity sensor included in the measurement device and attached to the test club.

A fitting apparatus according to a fifth aspect is the fitting apparatus according to any of the first to fourth aspects, in which the calculation unit acquires one or more preliminary indices representing a characteristic of the swing action, different from the one or more first indices, based on the measurement data, and the selection unit selects the balance, according to the one or more preliminary indices in addition to the one or more first indices.

A fitting apparatus according to a sixth aspect is the fitting apparatus according to the fifth aspect, in which the one or more preliminary indices include at least one of an index indicating power output by an arm of the golfer at the time of the swing action, an index indicating power input to the test club at the time of the swing action, an index indicating energy exerted by the golfer at the time of the swing action, and an index indicating a torque exerted by the golfer at the time of the swing action.

A fitting apparatus according to a seventh aspect is the fitting apparatus according to any of the first to sixth aspects, in which the one or more second indices includes at least one of an index indicating power output by an arm of the golfer at the time of the swing action, an index indicating power input to the test club at the time of the swing action, an index indicating energy exerted by the golfer at the time of the swing action, and an index indicating torque exerted by the golfer at the time of the swing action.

A fitting apparatus according to an eighth aspect is the fitting apparatus according to any of the first to seventh aspects, in which the calculation unit calculates one or more third indices representing a characteristic of the swing action, different from the one or more first indices and the one or more second indices, based on the measurement data. The selection unit selects a stiffness of a shaft suitable for the golfer, according to the one or more third indices.

A fitting program according to a ninth aspect causes a computer to execute the following:

acquiring measurement data obtained by measuring a swing action of a test club by a golfer with a measurement device;

calculating one or more first indices representing an amount of change in an openness of a face surface of a head included in the test club at a time of the swing action, based on the measurement data;

calculating one or more second indices representing a characteristic of the swing action, different from the one or more first indices, based on the measurement data;

selecting a balance of a golf club suitable for the golfer, according to the one or more first indices;

selecting at least one of a weight and a moment of inertia of a golf club suitable for the golfer, according to the one or more second indices; and selecting a golf club matching a condition of the balance and a condition of the at least one of the weight and the moment of inertia.

A fitting method according to a tenth aspect includes the following:

acquiring measurement data obtained by measuring a swing action of a test club by a golfer, using a measurement device;

calculating one or more first indices representing an amount of change in an openness of a face surface of a head included in the test club at a time of the swing action, based on the measurement data, using a computer;

calculating one or more second indices representing a characteristic of the swing action, different from the one or more first indices, based on the measurement data, using the computer;

selecting a balance of a golf club suitable for the golfer, according to the one or more first indices;

selecting at least one of a weight and a moment of inertia of a golf club suitable for the golfer, according to the one or more second indices; and recommending a golf club matching a condition of the balance and a condition of the at least one of the weight and the moment of inertia to the golfer.

According to knowledge gained by the inventors of the present invention, the amount of change in the openness of the face surface of the head included in the golf club at a time of the swing action by a golfer influences the balance of the golf club suitable for that golfer. In this regard, according to the above viewpoint, the balance of a golf club suitable for a golfer is selected, according to this amount of change in the openness of the face surface. Therefore, it becomes possible to select a golf club with a balance suitable for a golfer.

BRIEF DESCRIPTION OF THE DRAWINGS

FIG. 7 is a diagram illustrating flex of the shaft during the swing.

FIG. 15 is a table summarizing the relationship between optimal balance and an index representing the amount of change in the openness of the face surface of the head according to the third embodiment when a large number of golfers have actually taken practice hits with golf clubs.

DETAILED DESCRIPTION OF THE PREFERRED EMBODIMENTS

Description of Embodiments

Hereinafter, a golf club fitting apparatus, method and program according to a number of embodiments of the present invention will be described, with reference to the drawings.

1. First Embodiment 1-1. Schematic Configuration of Fitting System

Figure 1:
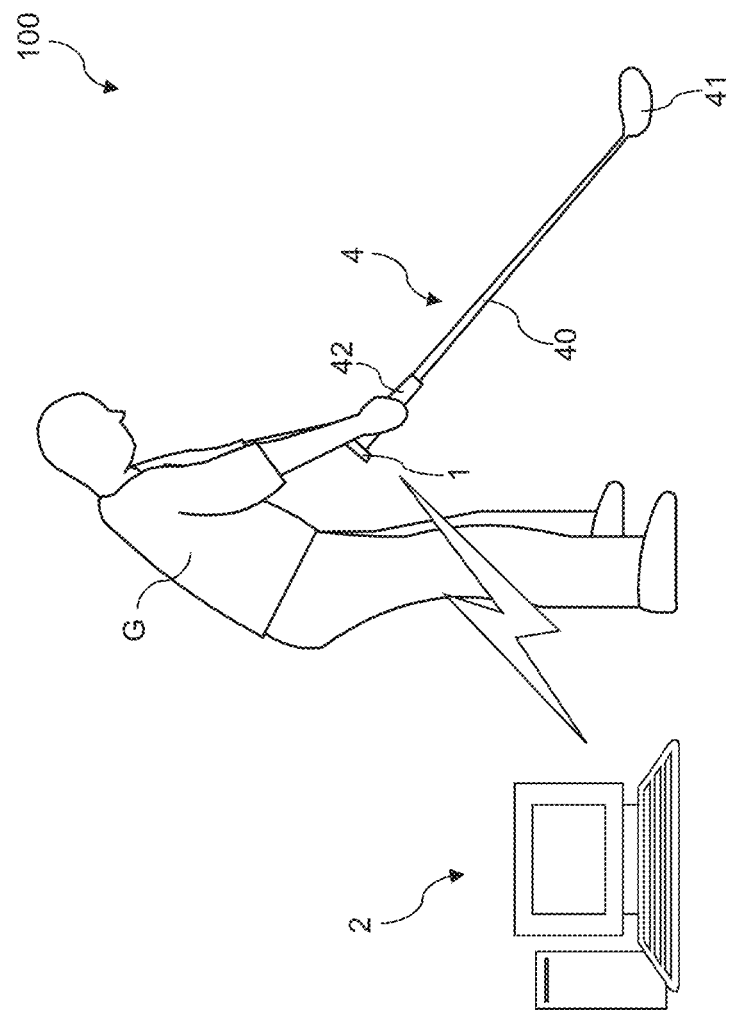
FIG. 1 is a diagram showing a fitting system provided with a fitting apparatus according to a first embodiment.
Figure 2:
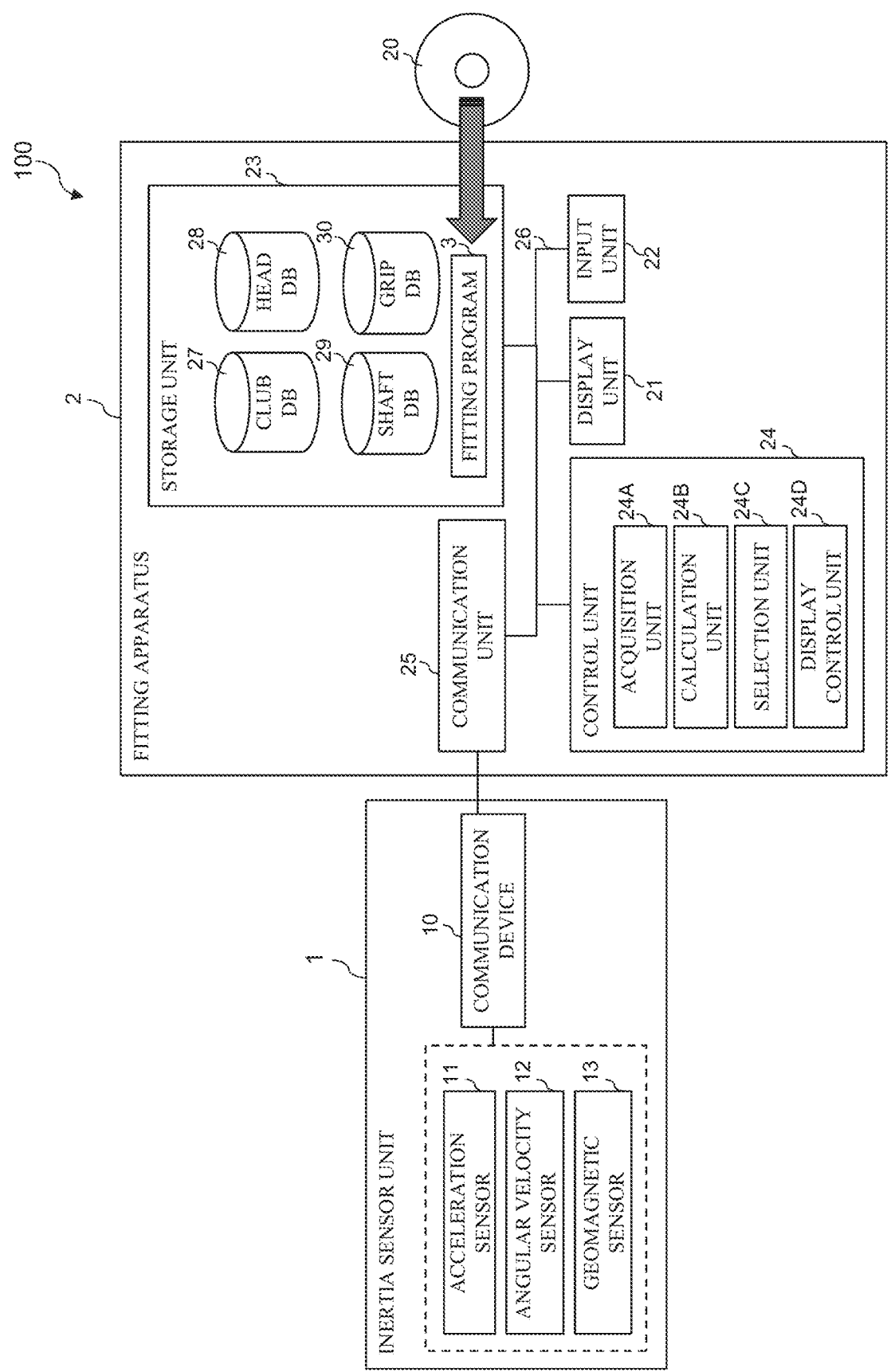
FIG. 2 is a functional block diagram of the fitting system according to the first embodiment.

FIGS. 1 and 2 show the overall configuration of a fitting system 100 provided with a fitting apparatus 2 according to the present embodiment. The fitting apparatus 2 is an apparatus for supporting selection of a golf club suitable for a golfer G, based on measurement data that measures the action of the golfer G swinging a golf club for use in testing (hereinafter, test club) 4. The test club 4 is a common golf club, and includes a shaft 40, a head 41 provided at one end of the shaft 40, and a grip 42 provided at the other end of the shaft 40. The measurement device that measures the swing action is, in the present embodiment, an inertia sensor unit 1. The fitting apparatus 2 together with this inertia sensor unit 1 constitutes the fitting system 100.

Hereinafter, the configurations of the inertia sensor unit 1 and the fitting apparatus 2 will be described, following by a description of the flow of fitting processing.

1-2. Component Configurations

1-2-1. Configuration of Inertia Sensor Unit

The inertia sensor unit 1 is, as shown in FIG. 1, attached to an end part of the grip 42 of the test club 4 on the opposite side to the head 41, and measures the behavior of the grip 42. The inertia sensor unit 1 is constituted to be compact and lightweight, so as to not interfere with the swing action. The inertia sensor unit 1 can be constituted to be detachable from the test club 4.

As shown in FIG. 2, an acceleration sensor 11, an angular velocity sensor 12 and a geomagnetic sensor 13 are installed in the inertia sensor unit 1. A communication device 10 for transmitting measurement data that is output by these sensors 11 to 13 to the external fitting apparatus 2 is also installed in the inertia sensor unit 1. Note that, in the present embodiment, the communication device 10 is a wireless communication device so as to not interfere with the swing action, but may be configured to connect to the fitting apparatus 2 via a cable in a wired manner.

The acceleration sensor 11, the angular velocity sensor 12 and the geomagnetic sensor 13 respectively measure acceleration, angular velocity and geomagnetism in an xyz local coordinate system whose origin is the attachment position of these sensors 11 to 13. More specifically, the acceleration sensor 11 measures accelerations $a_x$, $a_y$ and $a_z$ in the x-axis, y-axis and z-axis directions. The angular velocity sensor 12 measures angular velocities $\omega_x$, $\omega_y$ and $\omega_z$ about the x-axis, y-axis and z-axis. The geomagnetic sensor 13 measures geomagnetisms $m_x$, $m_y$ and $m_z$ in the x-axis, y-axis and z-axis directions. This measurement data is collected as time series data in a predetermined sampling period $\Delta t$, and transmitted to the fitting apparatus 2 via the communication device 10. The xyz local coordinate system is a three-axis orthogonal coordinate system, with the z-axis being oriented approximately parallel to the shaft 40. The x-axis is oriented so as to be as parallel as possible to the toe-heel direction of the head 41, and the y-axis is oriented so as to be as parallel as possible to the normal direction of the face surface of the head 41.

1-2-2. Configuration of Fitting Apparatus

The fitting apparatus 2 is a general-purpose computer in terms of hardware, and is, for example, realized as a desktop computer, a laptop computer, a tablet computer, a smartphone, or the like. As shown in FIG. 2, the fitting apparatus 2 is manufactured by installing a fitting program 3 according to the present embodiment in a general-purpose computer. The fitting program 3 is acquired by the fitting apparatus 2 from a recording medium 20 such as a CD-ROM that is computer readable or via a communication network such as a Local Area Network (LAN) or the Internet that is connected to a communication unit 25. The fitting program 3 is software for analyzing the swing action based on measurement data transmitted from the inertia sensor unit 1, and outputting information that supports selection of a golf club suitable for the golfer G. The fitting program 3 causes the fitting apparatus 2 to execute operations which will be discussed later.

The fitting apparatus 2 is provided with a display unit 21, an input unit 22, a storage unit 23, a control unit 24, and a communication unit 25. These units 21 to 25 are connected via a bus line 26, and are capable of communicating with each other. In the present embodiment, the display unit 21 is constituted by a liquid crystal display or the like, and displays information which will be discussed later to a user. Note that the user referred to here is a general term for a person who requires the results of fitting such as the golfer G himself, an instructor of the golfer G, or a salesperson of golf clubs. The input unit 22 can be constituted by a mouse, a keyboard, a touch panel and the like and receives operations on the fitting apparatus 2 by the user. The communication unit 25 is a communication interface that enables communication between the fitting apparatus 2 and an external device, and receives measurement data from the inertia sensor unit 1.

The storage unit 23 is constituted by a nonvolatile storage device such as a hard disk. The measurement data transmitted from the inertia sensor unit 1 is saved in the storage unit 23, in addition to the fitting program 3 being stored therein. Also, the storage unit 23 stores a club database (DB) 27, a head database (DB) 28, a shaft database (DB) 29, and a grip database (DB) 30. The club DB 27 stores information indicating various specifications (overall weight, head weight, head volume, shaft weight, shaft length, various shaft stiffnesses, loft angle, balance, etc.) of a large number of golf clubs in association with information specifying the type of golf club. Similarly, the head DB 28 stores information indicating various specifications (weight, volume, loft angle, etc.) of a large number of heads in association with information specifying the type of head, the shaft DB 29 stores information indicating various specifications (weight, length, various stiffnesses, etc.) of a large number of shafts in association with information specifying the type of shaft, and the grip DB 30 stores information indicating various specifications (weight, firmness, etc.) of a large number of grips in association with information specifying the type of grip.

The control unit 24 can be constituted by a CPU, a ROM, a RAM, and the like. The control unit 24 operates as an acquisition unit 24A, a calculation unit 24B, a selection unit 24C and a display control unit 24D in a virtual manner, by reading out and executing the fitting program 3 stored in the storage unit 23. The operations of the units 24A to 24D will be discussed in detail later.

1-3. Fitting Processing

Next, the fitting processing that is executed by the fitting system 100 will be described. First, to give an outline of this processing, measurement data that measures the action when the golfer G takes practice hits with the test club 4 is acquired, and the specifications (hereinafter, also referred to as optimal specifications) of a golf club suitable for the golfer G are determined, based on this measurement data. A golf club that matches the conditions of the optimal specifications is then selected as a golf club (hereinafter, also referred to as the optimal club) suitable for the golfer G, and recommended to the golfer G. It is thereby possible to provide the golfer G with the optimal club having optimal specifications matching the characteristics of the swing action of the golfer G. Hence, the shots of the golfer G can be improved, such as increasing the distance of shots and reducing lateral deflection.

In the present embodiment, the balance (hereinafter, also referred to as optimal balance) suitable for the golfer G is determined as one item of the optimal specifications. Balance, also known as swing weight, is an index representing how heavy the head feels when a golf club is swung, and influences the swing feel. Generally, balance is represented by a combination of the letters A to E and the numbers 0 to 9, with "A0" being the lightest and "E9" being the heaviest. The balance being "heavy" means that the center of gravity of the golf club is closer to the head and that the resistance of the head will be more noticeable when the golf club is swung, and, accordingly, could mean that the golf club is harder to swing. Conversely, the balance being "light" means that the center of gravity of the golf club is closer to the grip and that the resistance of the head will be less noticeable when the golf club is swung, and, accordingly, could means that the golf club is easier to swing. In the present embodiment, a golf club that matches the characteristics of the swing action of the golfer G is selected with consideration for balance such as described above.

Also, in the present embodiment, the weight (hereinafter, also referred to as optimal weight) of a golf club suitable for the golfer G is determined, as another item of the optimal specifications. The optimal weight referred to in the present embodiment is, more specifically, the weight of the shaft (hereinafter, also referred to as optimal shaft weight) included in a golf club suitable for the golfer G.

Also, in the present embodiment, the stiffness (hereinafter, also referred to as optimal stiffness) of a shaft suitable for the golfer G is determined, as another item of the optimal specifications. The stiffness of the shaft referred to in the present embodiment is evaluated as the distribution (hereinafter, also referred to as EI distribution) of flexural stiffness at a plurality of positions along the shaft. The EI distribution according to the present embodiment is quantitatively represented using a numerical value, and, more specifically, is represented using an International Flex Code (IFC). Here, this IFC will be described. Note that an IFC is a known index indicating the properties of shafts that has been widely proposed by the applicant, and has already been described in detail in various documents including JP 2017-170105A, for example. Accordingly, while a further description is not really necessary here, a brief description will be given here for reference.

Figure 3:
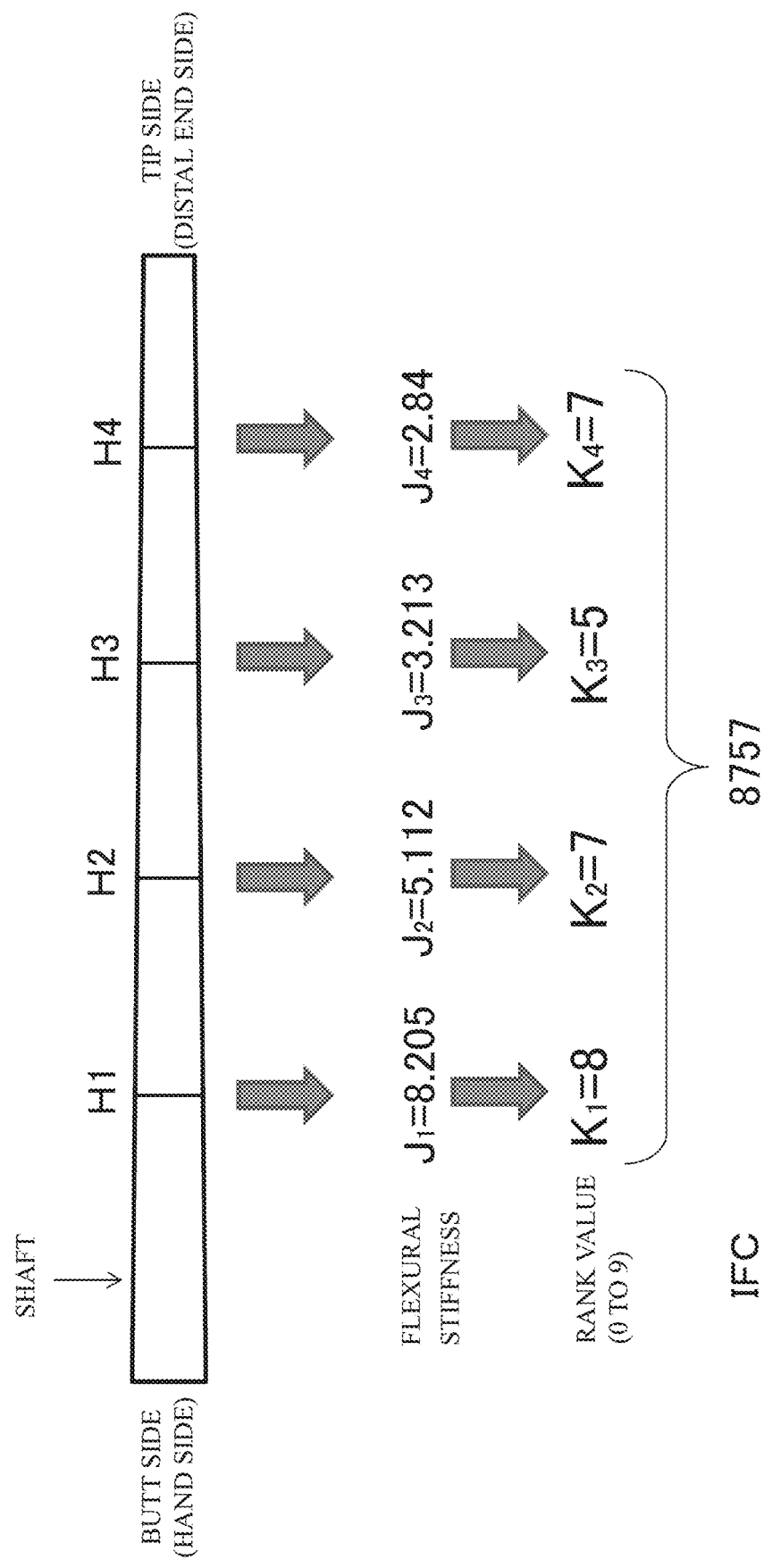
FIG. 3 is a diagram illustrating an International Flex Code (IFC).

An IFC is, as shown in FIG. 3, a code that represents the flexural stiffness of a shaft at each of four positions H1 to H4 in the direction in which the shaft extends with a single digit numerical value from 0 to 9, with the four numerical values being arrayed in the direction in which the shaft extends. More specifically, four measurement points H1 to H4 are defined at roughly fixed intervals in this order from the butt end to the tip end of the shaft. For example, places 36 inches, 26 inches, 16 inches and 6 inches from the tip end of the shaft can be respectively set as measurement points H1, H2, H3 and H4. Also, respective values (hereinafter, also referred to as EI values) $J_1$ to $J_4$ of the flexural stiffness at these four measurement points H1 to H4 are measured.

Next, the EI values $J_1$ to $J_4$ at the above four measurement points H1 to H4 are respectively converted into 10-step rank values $K_1$ to $K_4$. Specifically, the rank values $K_1$ to $K_4$ can be calculated from the EI values $J_1$ to $J_4$, in accordance with respective conversion rules prepared for the measurement points H1 to H4. The four rank values $K_1$ to $K_4$ respectively given to the measurement points H1 to H4 in this way are arrayed such that the values corresponding more to the butt side are positioned more on the left and the values corresponding more to the tip side are positioned more on the right. The 4-digit code thus obtained is an IFC. With an IFC, a larger numerical value of the respective digits means that the stiffness at the corresponding positions is higher. In the present embodiment, a golf club having a shaft that matches the characteristics of the swing action of the golfer G is selected, with consideration for an IFC as described above.

Figure 4:
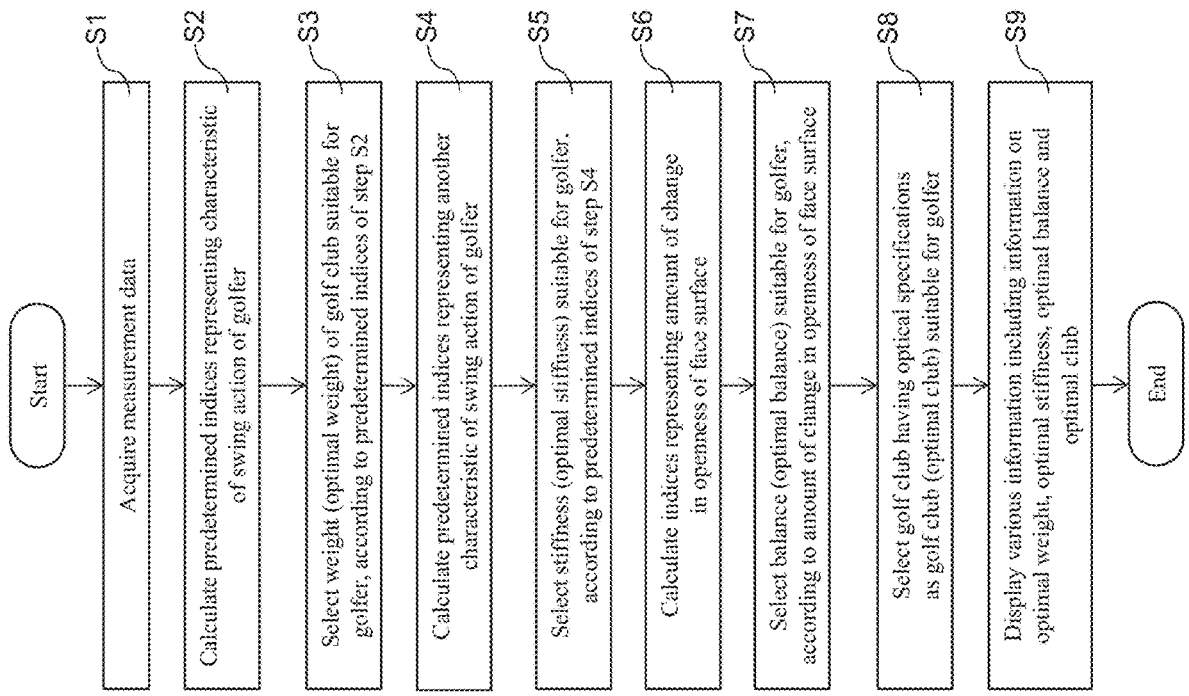
FIG. 4 is a flowchart showing the flow of fitting processing according to the first embodiment.

The fitting processing according to the present embodiment proceeds, more specifically, as shown FIG. 4. First, in step S1, measurement data is collected. More specifically, the golfer G swings the test club 4 to which the inertia sensor unit 1 is attached, and hits a ball. At this time, the inertia sensor unit 1 measures the time series data of the accelerations $a_x$, $a_y$ and $a_z$, angular velocities $\omega_x$, $\omega_y$ and $\omega_z$ and geomagnetisms $m_x$, $m_y$ and $m_z$ at least from address to finish.

This time series data is transmitted to the fitting apparatus 2 via the communication device 10, as measurement data that measures the swing action of the test club 4 by the golfer G. On the other hand, on the fitting apparatus 2 side, the acquisition unit 24A acquires this measurement data via the communication unit 25, and stores the acquired measurement data in the storage unit 23.

In the following step S2, the calculation unit 24B calculates predetermined indices $A_1$ for selecting the optimal weight (optimal shaft weight) that represent a characteristic of the swing action of the golfer G, based on measurement data stored in the storage unit 23. In the present embodiment, as such indices $A_1$, a power (hereinafter, arm output power) $P_1$ output by the arms of the golfer G during the swing action, and a power (hereinafter, club input power) $P_2$ input to the test club 4 during the swing action are calculated. The arm output power $P_1$ and the club input power $P_2$ are known indices that are described in detail in JP 2017-170105A and the like, for example, and can be defined as shown in the following equations.

$$P_1 = T_{g1}\omega_1 - T_{g2}\omega_1 \quad \text{Equation 1}$$

$$P_2 = R_2 v_g^T \quad \text{Equation 2}$$

Figure 5:
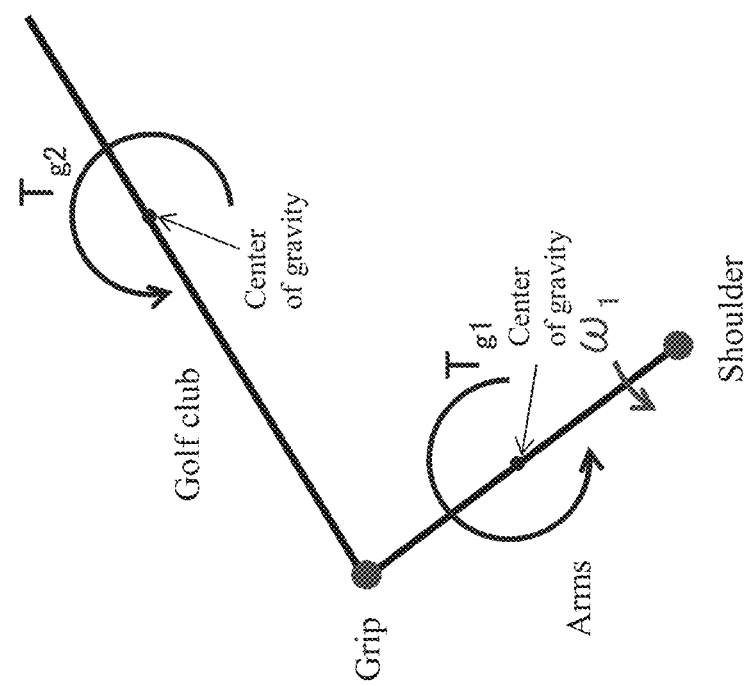
FIG. 5 is a diagram illustrating a model for calculating various indices.

Here, $T_{g1}$ signifies torque about the center of gravity of the arms of the golfer G, $T_{g2}$ signifies torque about the center of gravity of the golf club, and $\omega_1$ signifies the angular velocity of the arms of the golfer G. $R_2$ is the constraint force acting on the grip, and $v_g$ is the velocity vector of the grip. The arm output power $P_1$ and the club input power $P_2$ can be analyzed using a pendulum model in which the arms and the golf club are links and the shoulder and the grip are nodes, such as shown in FIG. 5. Note that, although not limited thereto, in the present embodiment, the arm output power serving as an index $A_1$ is calculated as an average arm output power $P_1$ (hereinafter, also referred to as $P_{1\_AVE}$) that occurs during the swing action, and, more specifically, is calculated by integrating the arm output power $P_1$ in the interval from the time at top to the time at which the arm output power $P_1$ takes the maximum value, and dividing this integrated value by the integration interval. Similarly, the club input power serving as an index $A_1$ is also calculated as an average club input power $P_2$ (hereinafter, also referred to as $P_{2\_AVE}$) that occurs during the swing action, and, more specifically, is calculated by integrating the club input power $P_2$ in the interval from the time at top to the time at which the club input power $P_2$ takes the maximum value, and dividing this integrated value by the integration interval.

Figure 6:
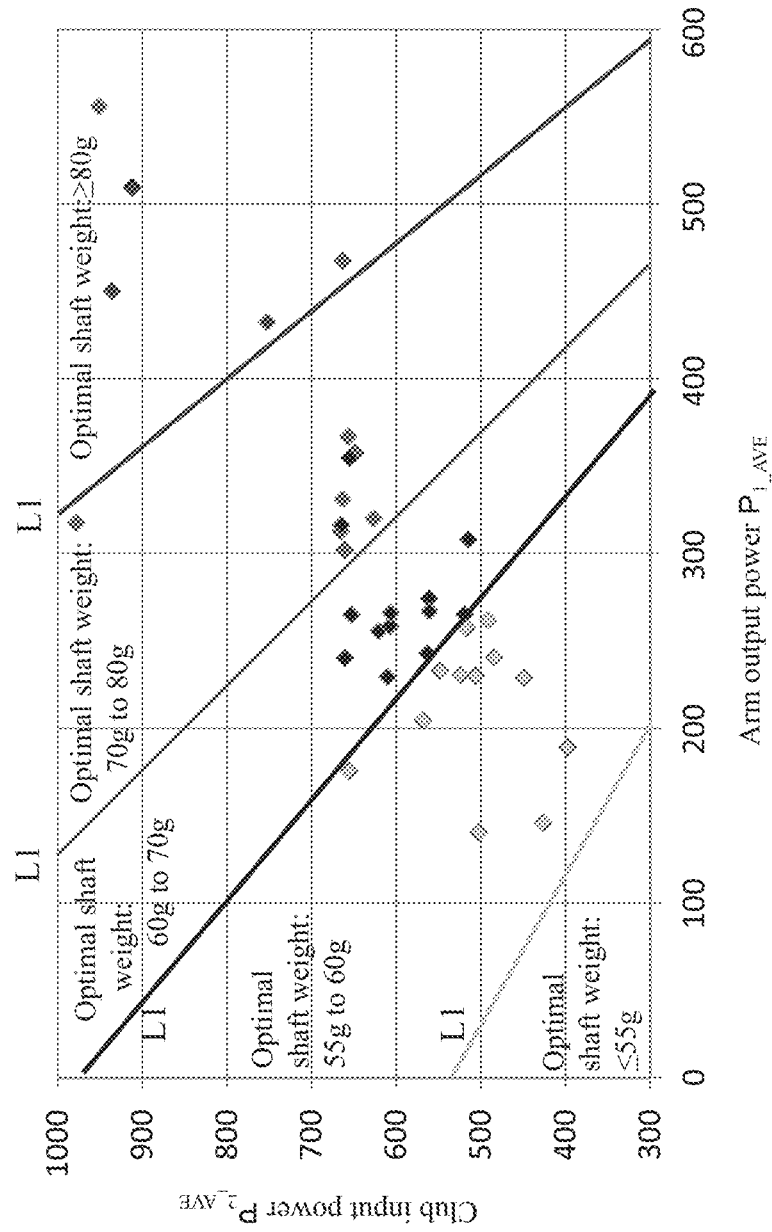
FIG. 6 is a graph representing the relationship of optimal shaft weight with arm output power and club input power.

In the following step S3, the selection unit 24C selects the optimal weight (optimal shaft weight), according to the indices $A_1$ (arm output power $P_{1\_AVE}$ and club input power $P_{2\_AVE}$) calculated in step S2. As also disclosed in JP 2017-170105A and the like, the tendency for the optimal weight to be larger as the arm output power $P_{1\_AVE}$ increases, and, similarly, for the optimal weight to be larger as the club input power $P_{2\_AVE}$ increases is known. In particular, the optimal weight can be determined with higher probability when a plurality of indices such as $P_{1\_AVE}$ and $P_{2\_AVE}$ are combined. FIG. 6 is a graph representing the relationship of optimal shaft weight with arm output power $P_{1\_AVE}$ and club input power $P_{2\_AVE}$ with respect to a specific head. As shown in FIG. 6, a plane whose axes are arm output power $P_{1\_AVE}$ and club input power $P_{2\_AVE}$ is divided into a plurality of regions to which larger optimal weights are associated toward the upper right.

Based on the above knowledge, in step S3, the selection unit 24C plots the values of the arm output power $P_{1\_AVE}$ and the club input power $P_{2\_AVE}$ calculated in step S2 on a plane (see graph region of FIG. 6) whose axes are these two indices $P_{1\_AVE}$ and $P_{2\_AVE}$, and judges which of regions that are divided by predetermined boundary lines (refer to L1 in FIG. 6) the plotted points belong to within this plane. The selection unit 24C then selects the optimal weight (optimal shaft weight) that is associated in advance with the region to which the plotted points belong. Note that, from the viewpoint of more accurately determining the optimal shaft weight, information specifying the above boundary lines and information on the optimal shaft weights associated with the regions that are divided by the boundary lines (hereinafter, shaft weight determination information) is preferably set for every type of head. Thus, in the present embodiment, the shaft weight determination information is stored in advance, for each type of a large number of heads, in the storage unit 23. The selection unit 24C then receives input of information specifying the type of head, from the user via the input unit 22, and determines the optimal shaft weight, based on the shaft weight determination information corresponding to the specified type of head.

In the following step S4, the calculation unit 24B calculates predetermined indices $B_1$ for selecting the optimal stiffness that represent another characteristic of the swing action of the golfer G, based on measurement data stored in the storage unit 23. In the present embodiment, first to fourth feature amounts $F_1$ to $F_4$ are calculated as such indices $B_1$. The first to fourth feature amounts $F_1$ to $F_4$ are respectively indices for selecting optimal EI values $J_{S1}$ to $J_{S4}$ which are EI values $J_1$ to $J_4$ suitable for the golfer G, and, hence, for selecting optimal rank values $K_{S1}$ to $K_{S4}$ which are rank values $K_1$ to $K_4$ suitable for the golfer G. Note that, while clear from the above description, the numeric string consisting of the optimal rank values $K_{S1}$ to $K_{S4}$ arranged from left to right is the optimal stiffness of the present embodiment, that is, the IFC (hereinafter, also referred to as optimal IFC) suitable for the golfer G. Thus, in the present embodiment, feature amounts such as the following that are respectively correlated with the optimal EI values $J_{S1}$ to $J_{S4}$ are calculated as the first to fourth feature amounts $F_1$ to $F_4$. The examples of indices $B_1$ for selecting the optimal stiffness are, however, not limited thereto.

The first feature amount $F_1$ is the slope of the angular velocity $\omega_y$ in the wrist-cock direction near the top, and can, for example, be represented by the sum of the angular velocity $\omega_y$ that occurs 50 ms before the top and the angular velocity $\omega_y$ that occurs 50 ms after the top.

The second feature amount $F_2$ is the average value of the angular velocity $\omega_y$ from top to the point in time at which the angular velocity $\omega_y$ is at a maximum. The second feature amount $F_2$ is calculated by first deriving the point in time at which the angular velocity $\omega_y$ is at a maximum from top to impact, and dividing the accumulated value of the angular velocity $\omega_y$ from top to that point in time by the time period from top to that point in time.

The third feature amount $F_3$ is the average value of the angular velocity $\omega_y$ from the point in time at which the angular velocity $\omega_y$ is at a maximum to impact. The third feature amount $F_3$ is calculated by dividing the accumulated value of the angular velocity $\omega_y$ from point in time at which the angular velocity $\omega_y$ is at a maximum to impact by the time period from the point in time at which the angular velocity $\omega_y$ is at a maximum to impact.

The fourth feature amount $F_4$ is the average value of angular velocity $\omega_y$ from top to impact, and is calculated by dividing the accumulated value of the angular velocity $\omega_y$ from top to impact by the time period from top to impact.

Incidentally, since the head whose weight is comparatively large is at the distal end of the shaft of a golf club, the shaft flexes during the swing action due to the inertia of the head. This flex does not occur in the same place of the shaft in all phases of the swing but travels from close to the hands toward the distal end of the shaft from top to impact, as shown in FIG. 7. In other words, the flex position of the shaft shifts from close to the hands toward the distal end of the shaft, as the swing progresses from top to impact.

More specifically, at the point in time at which the golf club is taken back from address and reaches the top (at the point in time indicated by (1) in FIG. 7), the shaft flexes close to the hands. Subsequently, when the backswing transitions to the initial phase of the downswing (at the point in time indicated by (2) in FIG. 7), the flex shifts slightly toward the distal end of the shaft. Furthermore, at the point in time at which arms of the golfer G are horizontal (at the point in time indicated by (3) in FIG. 7), the flex shifts to the distal end side of the middle of the shaft. Then, immediately before impact (at the point in time indicated by (4) in FIG. 7), the flex shifts to near the distal end of the shaft.

Accordingly, the first to fourth feature amounts $F_1$ to $F_4$ can be respectively calculated based on the measurement data of first to forth intervals from near the top to near impact during the swing action. Also, the first to third intervals referred to here are in chronological order, and do not partially or wholly overlaps each other.

In the following step S5, the selection unit 24C selects the optimal stiffness (optimal IFC), according to the indices $B_1$ (first to fourth feature amounts $F_1$ to $F_4$) calculated in step S4. In the present embodiment, at this time, the optimal EI values $J_{S1}$ to $J_{S4}$ are calculated, based on the following approximation equations representing the correlation relationship between first to fourth feature amounts $F_1$ to $F_4$ and optimal EI values $J_{S1}$ to $J_{S4}$.

$$J_{S1} = a_1 \cdot F_1 + b_1$$

$$J_{S2} = a_2 \cdot F_2 + b_2$$

$$J_{S3} = a_3 \cdot F_3 + b_3$$

$$J_{S4} = a_4 \cdot F_4 + b_4$$

In the above equations, $a_1$ to $a_4$ and $b_1$ to $b_4$ are constants that are determined in advance by regression analysis that is based on a large number of data sets obtained through testing, and stored in advance in the storage unit 23. Note that since derivation methods of $a_1$ to $a_4$ and $b_1$ to $b_4$ are disclosed in JP 2017-170105A and JP 2013-226375A, for example, detailed description will be omitted here.

The selection unit 24C calculates the optimal EI values $J_{S1}$ to $J_{S4}$, by substituting the first to fourth feature amounts $F_1$ to $F_4$ calculated in step S4 into the above approximation equations. Next, the selection unit 24C respectively converts the optimal EI values $J_{S1}$ to $J_{S4}$ into the optimal rank values $K_{S1}$ to $K_{S4}$, in accordance with predetermined conversion rules determined in advance. The optimal IFC is then determined, by combining the optimal rank values $K_{S1}$ to $K_{S4}$.

In the following step S6, the calculation unit 24B calculates predetermined indices $C_1$ for selecting the optimal balance that represent a characteristic of the swing action of the golfer G, based on measurement data stored in the storage unit 23. The indices $C_1$ are indices representing the amount of change in the openness of a face surface 41a of the head 41 at the time of the swing action, and, in the present embodiment, include two indices $C_{11}$ and $C_{12}$ that are defined as follows.

$$C_{11} = |\omega_{z\_imp} - \omega_{z\_top}| \qquad \text{Equation 3}$$

$$C_{12} = \int_{top}^{impact} |\omega_x| dt \qquad \text{Equation 4}$$

Figure 8A:
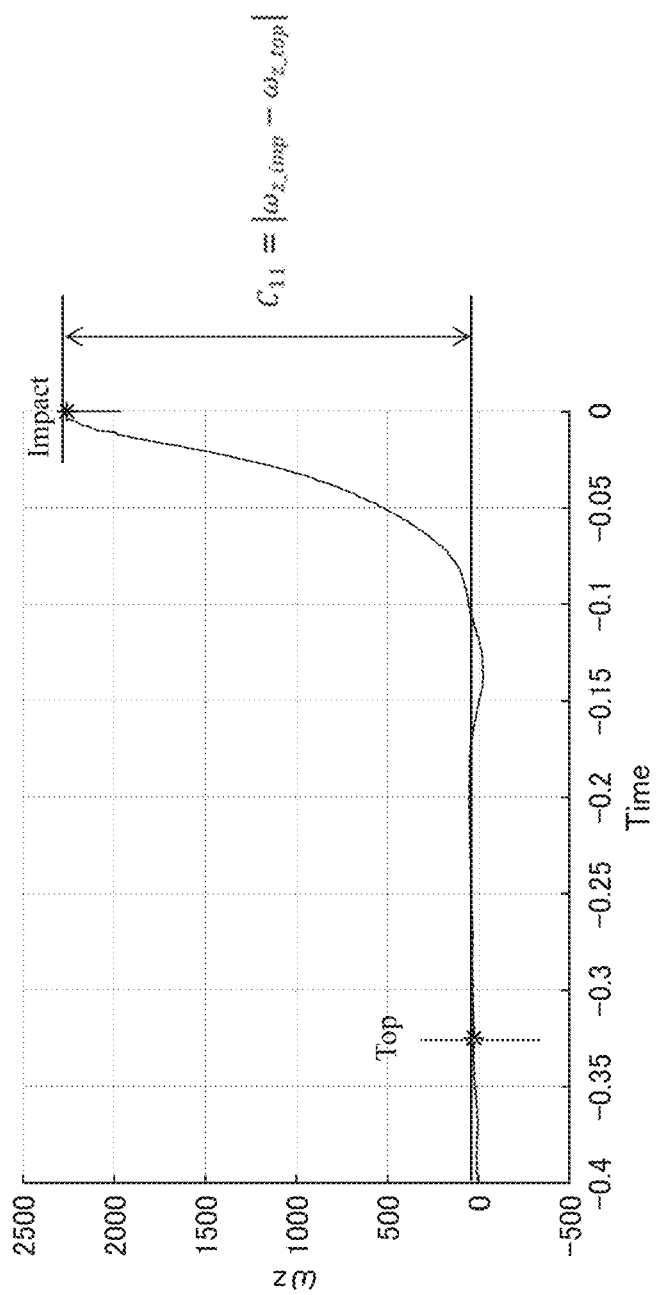
FIG. 8A is a diagram illustrating an index representing the amount of change in the openness of the face surface of the head according to the first embodiment.
Figure 8B:
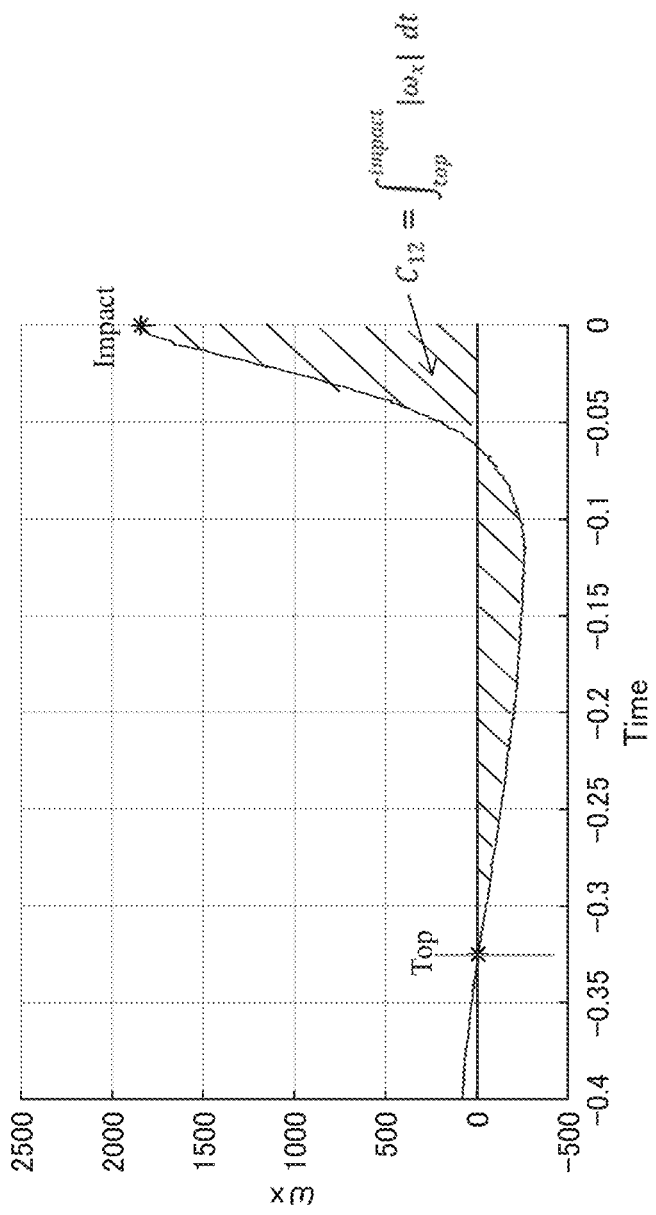
FIG. 8B is a diagram illustrating a different index representing the amount of change in the openness of the face surface of the head according to the first embodiment.

Here, $\omega_{z\_imp}$ is the angular velocity $\omega_z$ at the timing of impact, and $\omega_{z\_top}$ is the angular velocity $\omega_z$ at the timing of top. Also, the integration that is included in $C_{12}$ represents integration from the timing of top to the timing of impact. FIGS. 8A and 8B are diagrams illustrating the indices $C_{11}$ and $C_{12}$, using graphs of $\omega_z$ and $\omega_x$ obtained through actual measurement. Indices $C_{11}$ and $C_{12}$, as defined, can be calculated based on data of the angular velocities $\omega_x$ and $\omega_z$ included in the measurement data.

Calculation of the indices $C_1$ such as described above in step S6 is based on the knowledge that the amount of change in the openness of the face surface 41a at the time of the swing action influences the optimal balance. The inventors of the present invention gained this knowledge through the following testing.

First, the inventors got 23 test subjects to take practice hits with two golf clubs having different balances. One of the two golf clubs (hereinafter, also referred to as the normal club) had a balance "D5", and the other golf club (hereinafter, also referred to as the light balance club) had a balance "D2" that was lighter than the balance "D5". The normal club and the light balance club shared the same head and shaft, and the light balance club was prepared by changing the grip of the normal club to a heavier grip.

Figure 9:
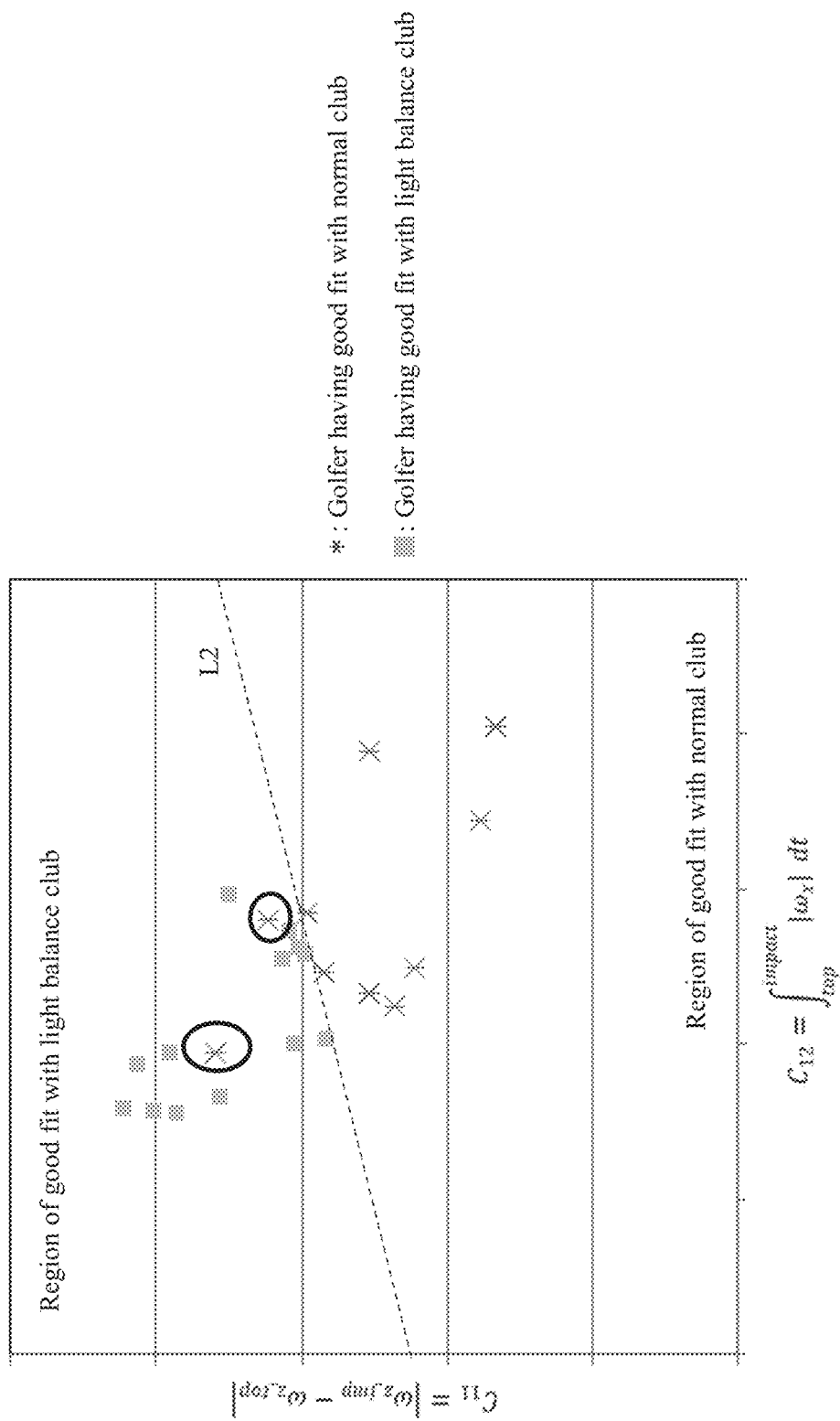
FIG. 9 is a graph summarizing the relationship of optimal balance with two indices representing the amount of change in the openness of the face surface of the head according to the first embodiment when a large number of golfers have actually taken practice hits with golf clubs.

Also, the inventors calculated the indices $C_{11}$ and $C_{12}$ when each of the 23 test subjects took practice hits with the normal club, with a similar measurement device and measurement method to those described above. Also, the club with the better shot results, out of the above two golf clubs, was specified for each of the 23 test subjects. The quality of the shot results was comprehensively evaluated by observing distance and directivity (lateral deflection). FIG. 9 is a graph summarizing the result of this evaluation. From the testing results shown in this graph, it was confirmed that the normal club tends to be more suitable for golfers for whom the index $C_{11}$ is small, and the light balance club tends to be more suitable for golfers for whom the index $C_{11}$ is large. Also, it was confirmed that the light balance club tends to be more suitable for golfers for whom the index $C_{12}$ is small, and the normal club tends to be more suitable for golfers for whom the index $C_{12}$ is large. Although the indices $C_{11}$ and $C_{12}$ both represent the amount of change in the openness of the face surface 41a at the time of the swing action, $\omega_z$ is, however, more dominant than $\omega_x$ with respect to the openness of the face surface 41a. As a result, the above tendency is more pronounced for the index $C_{11}$ than for the index $C_{12}$.

As a result of the above, it was found that, as shown in FIG. 9, a plane whose axes are the indices $C_{11}$ and $C_{12}$ is divided by a straight boundary line L2 into a region in which the normal club is a good fit and a region in which the light balance club is a good fit. Note that, in FIG. 9, results that deviate from the above tendency are circled. According to these testing results, the above tendency appeared in 21 out of 23 test subjects, that is, at a probability of over 91%. Therefore, it was found that the optimal balance can be determined as long as the amount of change in the openness of the face surface 41a at the time of the swing action, such as defined by the indices $C_{11}$ and $C_{12}$, is known.

Based on the above knowledge, in the following step S7, the selection unit 24C selects the optimal balance, according to the magnitude of the indices $C_{11}$ and $C_{12}$. More specifically, the selection unit 24C plots the values of the indices $C_{11}$ and $C_{12}$ calculated in step S6 on a plane whose axes are these two indices $C_{11}$ and $C_{12}$, and judges which of regions that are divided by a boundary line (refer to L2 in FIG. 9) determined in advance the plotted points belong to within this plane. The selection unit 24C then selects the balance that is associated in advance with the region to which the plotted points belong as the optimal balance. Note that, although there is one boundary line in the example of FIG. 9, the boundary line referred to here can be set to one or more boundary lines, and the optimal balance selected from two or three balances or more.

In the following step S8, the selection unit 24C selects a golf club having the optimal specifications selected in steps S3, S5 and S7 as the optimal club. That is, a golf club having the optimal weight selected in step S3, the optimal stiffness selected in step S5 and the optimal balance selected in step S7 is selected as the optimal club. More specifically, the selection unit 24C searches the club DB 27, extracts a golf club that matches the conditions of the optimal weight, optimal stiffness and optimal balance, and specifies this golf club as the optimal club. Alternatively, the selection unit 24C may combine an appropriate head, shaft and grip that are extracted from the head DB 28, shaft DB 29 and grip DB 30 to create a golf club that matches the conditions of the optimal weight, optimal stiffness and optimal balance, and specify this golf club as the optimal club. Note that, in the present embodiment, the type of head is specified by the user, as described above, and thus a golf club having a head of that type is specified as the optimal club.

In the following step S9, the display control unit 24D displays information specifying the optimal club selected in step S8 on the display unit 21, together with information on the optimal weight, information on the optimal rigid and information on the optimal balance respectively selected in steps S3, S5 and S7. A salesperson of golf clubs, an instructor or the like confirms such information on the display unit 21 with the golfer G, and recommends a golf club having the optimal weight, optimal stiffness and optimal balance to the golfer G. This ends the fitting processing.

2. Second Embodiment

Next, fitting processing according to the second embodiment will be described, with reference to FIG. 10. The main difference between the first embodiment and the second embodiment is that the indices for selecting the optimal balance are different. Hereinafter, description regarding the points in common with the first embodiment will be omitted, and the second embodiment will be described focusing on the differences between both embodiments.

More specifically, in the second embodiment, a preliminary index representing another characteristic of the swing action of the golfer G is calculated, as an index for selecting the optimal balance, in addition to the abovementioned indices $C_1$. The preliminary index is an index that is preliminarily taken into consideration in order to select the optimal balance. In the second embodiment, the optimal balance is determined according to the combination of the indices $C_1$ and the preliminary index (step S71). The preliminary index of the present embodiment is the arm output power $P_{1\_AVE}$, which is one of the indices $A_1$ for selecting the optimal weight.

Figure 11:
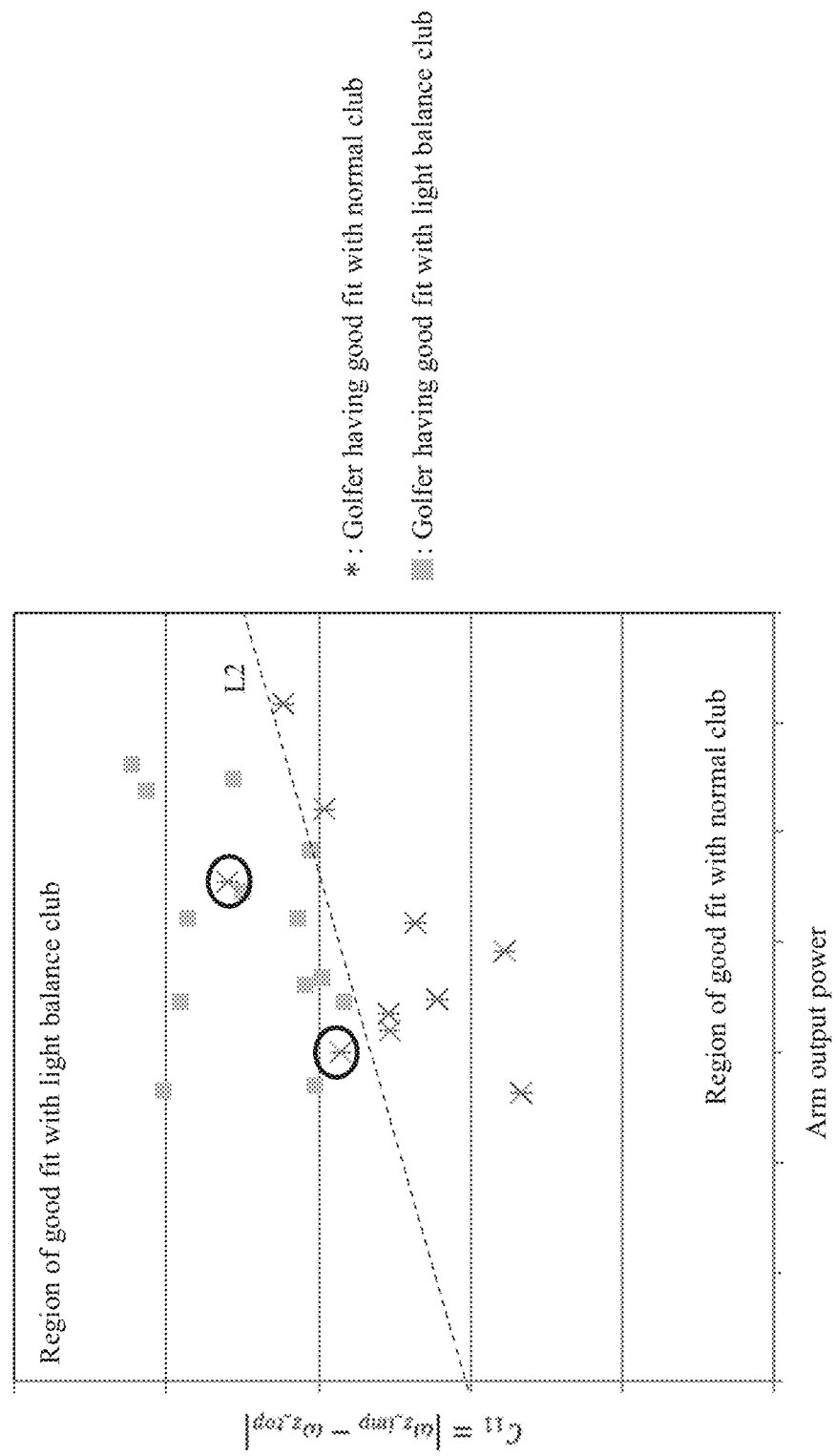
FIG. 11 is the graph summarizing the relationship of optimal balance with arm output power and an index representing the amount of change in the openness of the face surface of the head according to the second embodiment when a large number of golfers have actually taken practice hits with golf clubs.

FIG. 11 shows the result of calculating the arm output power $P_{1\_AVE}$ from measurement data acquired in the same testing as FIG. 9, and plotting this arm output power $P_{1\_AVE}$ and the index $C_{11}$ on a plane whose axes are these two indices. From this diagram, it was confirmed that, in the case where the index $C_{11}$ and the arm output power $P_{1\_AVE}$ are used, golfers for whom the normal club is a good fit and golfers for whom the light balance club is a good fit can also be stratified, with a high probability similar to the case of FIG. 9. Therefore, it was found that the optimal balance can be accurately determined, by combining the arm output power $P_1$ with the indices C representing the amount of change in the openness of the face surface 41a of the head 41 at the time of the swing action.

Figure 10:
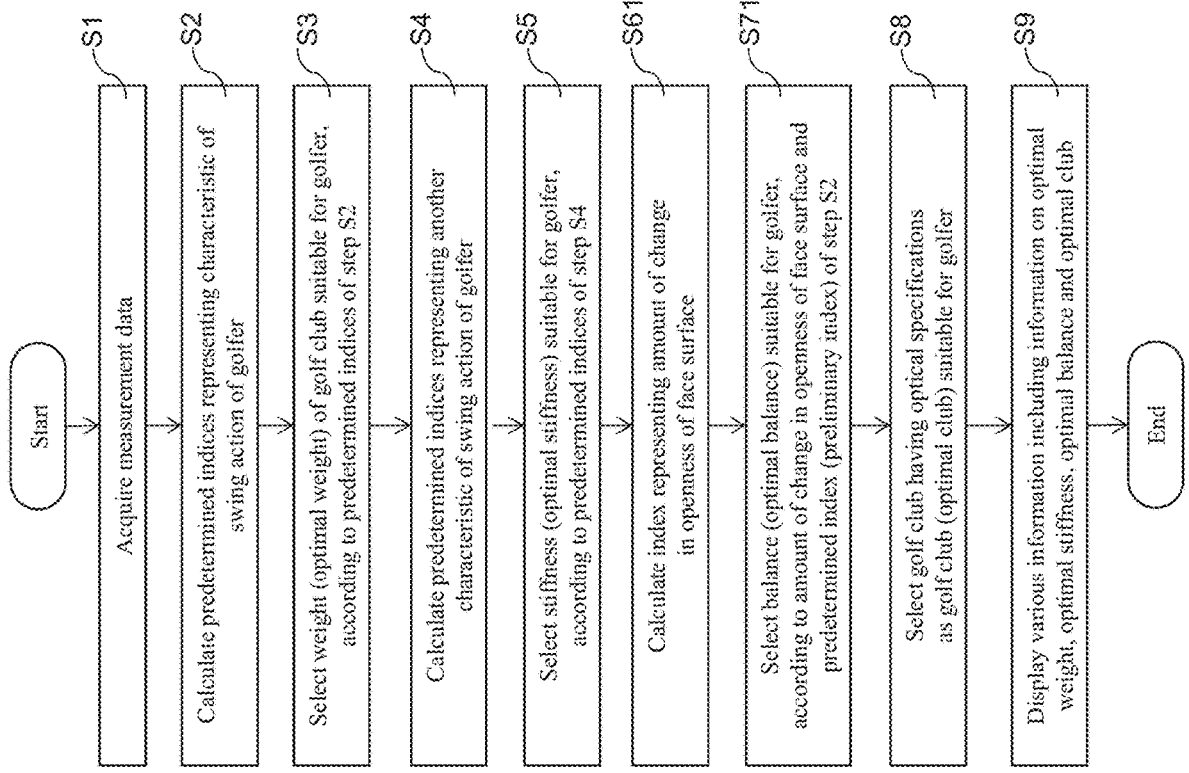
FIG. 10 is a flowchart showing the flow of fitting processing according to a second embodiment.

Based on the above knowledge, the fitting processing according to the second embodiment proceeds as shown in FIG. 10. Steps S1 to S5 are similar to the first embodiment. In the second embodiment, step S61 is executed after step S5 instead of step S6. Although step S61 is roughly similar to step S6, the calculation of the index $C_{12}$ is omitted, and only the index $C_{11}$ is calculated.

Thereafter, in the second embodiment, step S71 is executed instead of step S7. In step S71, the selection unit 24C acquires the preliminary index for selecting the optimal balance. In the present embodiment, the preliminary index has already been calculated in step S2 as one of the indices $A_1$ for selecting the optimal weight. Therefore, the selection unit 24C acquires the value of the arm output power $P_{1\_AVE}$ serving as the preliminary index, by appropriating the calculation result of step S2.

Next, the selection unit 24C selects the optimal balance, according to the magnitude of the index $C_1$ representing the amount of change in the openness of the face surface 41a and the arm output power $P_{1\_AVE}$ which is the preliminary index. More specifically, the selection unit 24C plots the values of the indices $C_{11}$ and $P_{1\_AVE}$ respectively calculated in steps S61 and S2 on a plane whose axes are these two indices $C_{11}$ and $P_{1\_AVE}$, and judges which of regions that are divided by the boundary line (refer to L2 in FIG. 11) determined in advance the plotted points belong to within this plane. The selection unit 24C then selects the balance that is associated in advance with the region to which the plotted points belong as the optimal balance. Note that, although there is one boundary line in the example in FIG. 11, the boundary line referred to here can be set to one or more boundary lines, and the optimal balance selected from two or three balances or more. Steps S8 and S9 after the optimal balance is selected are similar to the first embodiment.

3. Third Embodiment

Figure 12:
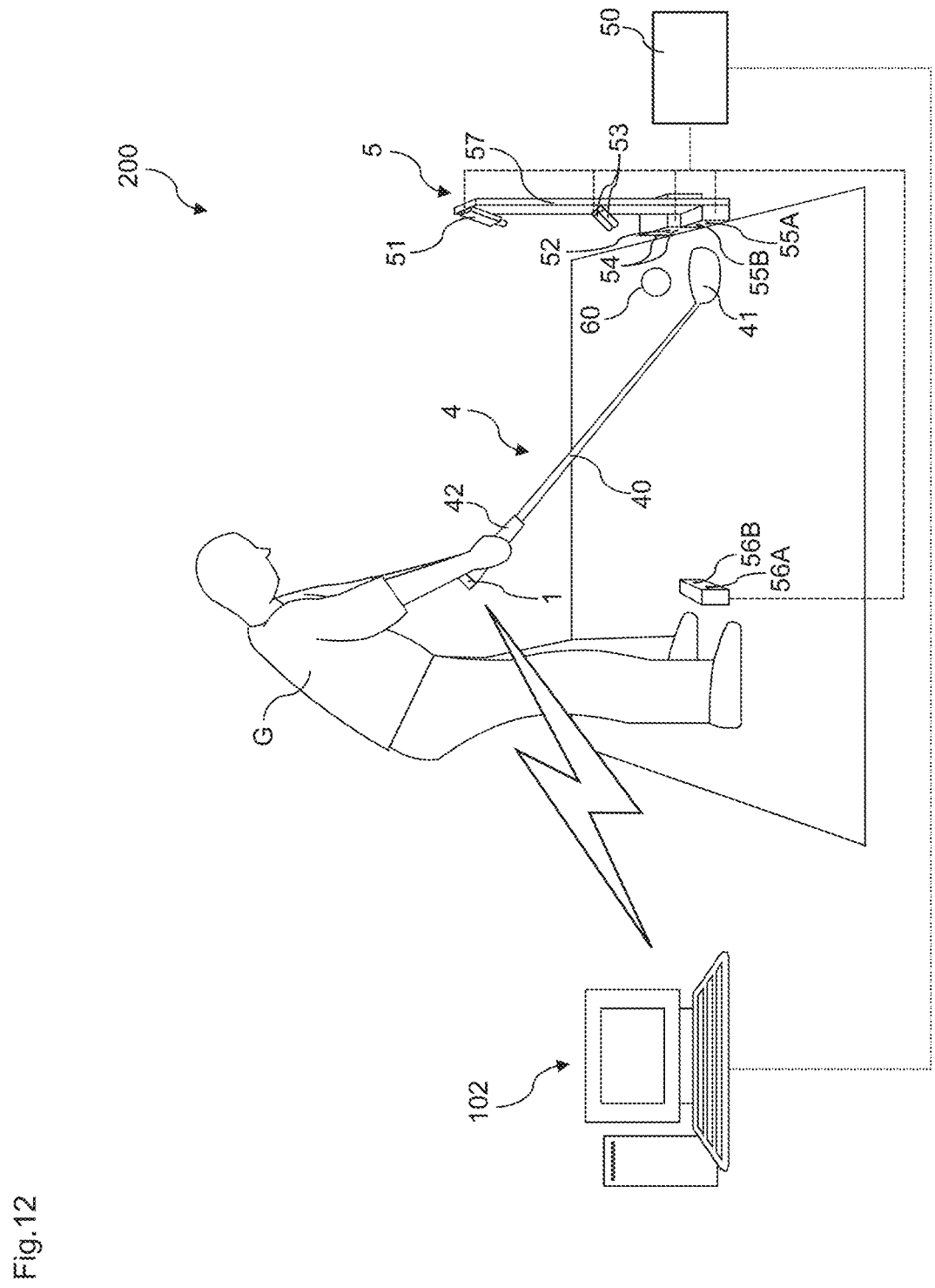
FIG. 12 is a diagram showing a fitting system provided with a fitting apparatus according to a third embodiment.
Figure 13:
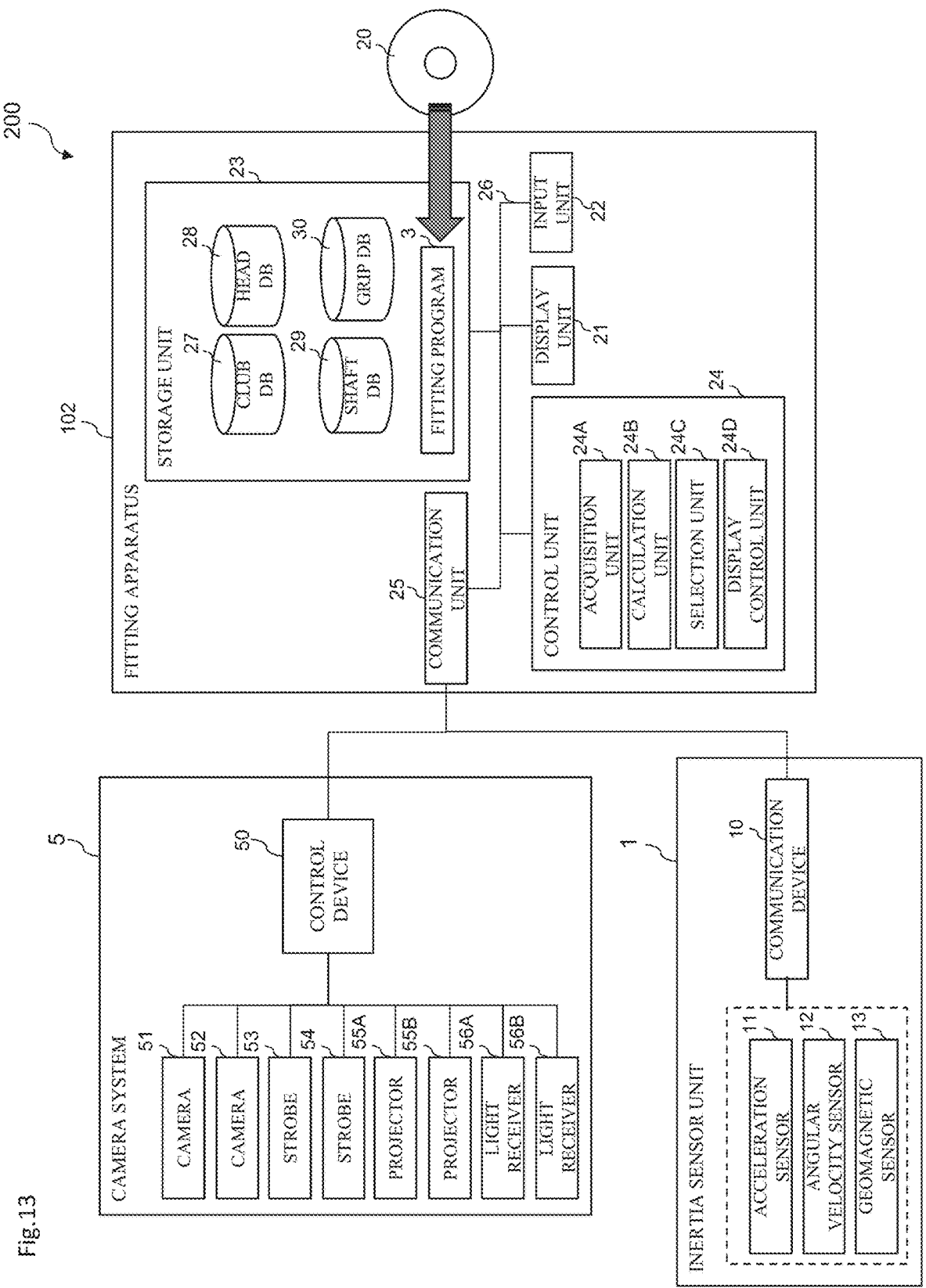
FIG. 13 is a functional block diagram of the fitting system according to the third embodiment.

The overall configuration of a fitting system 200 that has a fitting apparatus 102 according to a third embodiment is shown in FIGS. 12 and 13. The main difference between the first and second embodiments and the third embodiment is that the indices for selecting the optimal balance are different. Also, the configuration of the measurement device that measures the measurement data for calculating such indices is also different. Hereinafter, description regarding the points in common with the first and second embodiments will be omitted, and the third embodiment will be described focusing on the differences between these embodiments.

The measurement device that measures the swing action, in the third embodiment, includes a camera system 5, in addition to the inertia sensor unit 1. The camera system 5 is installed in a hitting mat on which the golfer G takes practice hits and measures the swing action of the golfer G standing on the hitting mat, in a dedicated place such as a golf shop or a golf school. As shown in FIGS. 12 and 13, the camera system 5 is provided with a plurality of cameras 51 and 52 and a plurality of strobes 53, 53, 54 and 54, and performs strobe shooting. The camera 51 is fixed to a support stand 57 in front of the golfer and is arranged obliquely above a ball 60 at address, so as to be able to shoot the behavior of the head 41 and the ball 60 around the time of impact from above. The strobes 53 and 53 are also fixed to the support stand 57 and are arranged downward of the camera 51. Also, the camera 52 is arranged forward of the ball 60 at address in front of the golfer G, so as to be able to shoot the behavior of the head 41 and the ball 60 around the time of impact from a different position to the camera 51. The strobes 54 and 54 are arranged on the left and right of the camera 52. Note that dots, lines and other markers are given to the head 41 and the golf ball 60 as appropriate, so as to facilitate extraction of the behavior of the head 41 and the ball 60 from image data shot with the cameras 51 and 52.

Also, the camera system 5 is provided with projectors 55A and 55B and light receivers 56A and 56B, with the projector 55A and the light receiver 56A constituting one timing sensor, and the projector 55B and the light receiver 56B constituting another timing sensor. Timing signals that are generated by these timing sensors are used in determining the timing of light emission by the strobes 53, 53, 54 and 54 and shooting by the cameras 51 and 52 that follows light emission.

Furthermore, the camera system 5 is also provided with a control device 50 for controlling the operations of the above devices 51 to 56B. The control device 50 has a CPU, a ROM, a RAM and the like, and is also connected to the communication unit 25 of the fitting apparatus 102, in addition to the devices 51 to 56B.

The projectors 55A and 55B are arranged downward of the camera 51 near the ground in front of the golfer G. On the other hand, the light receivers 56A and 56B are arranged near the toes of the golfer G. The projector 55A and the light receiver 56A are arranged on a straight line roughly parallel to a direction from the golfer G's back toward his abdomen, and oppose each other (refer to FIG. 12). The projector 55B and the light receiver 56B are similarly arranged. The projectors 55A and 55B constantly emit light respectively toward the light receivers 56A and 56B during the swing action by the golfer G, and the light receivers 56A and 56B receive this light. However, at the timing at which the test club 4 passes between the projectors 55A and 55B and the light receivers 56A and 56B, the light from the projectors 55A and 55B is blocked by the test club 4, and thus the light receivers 56A and 56B cannot receive this light. The light receivers 56A and 56B detect this timing, and generate timing signals in response. The control device 50 commands the strobes 53, 53, 54 and 54 to emit light and commands the cameras 51 and 52 to shoot images, at a predetermined timing that is based on the time at which the timing signals are generated. Measurement data in the form of image data shot by the cameras 51 and 52 is transmitted to the control device 50, and is further transmitted to the fitting apparatus 102 from the control device 50.

Figure 14:
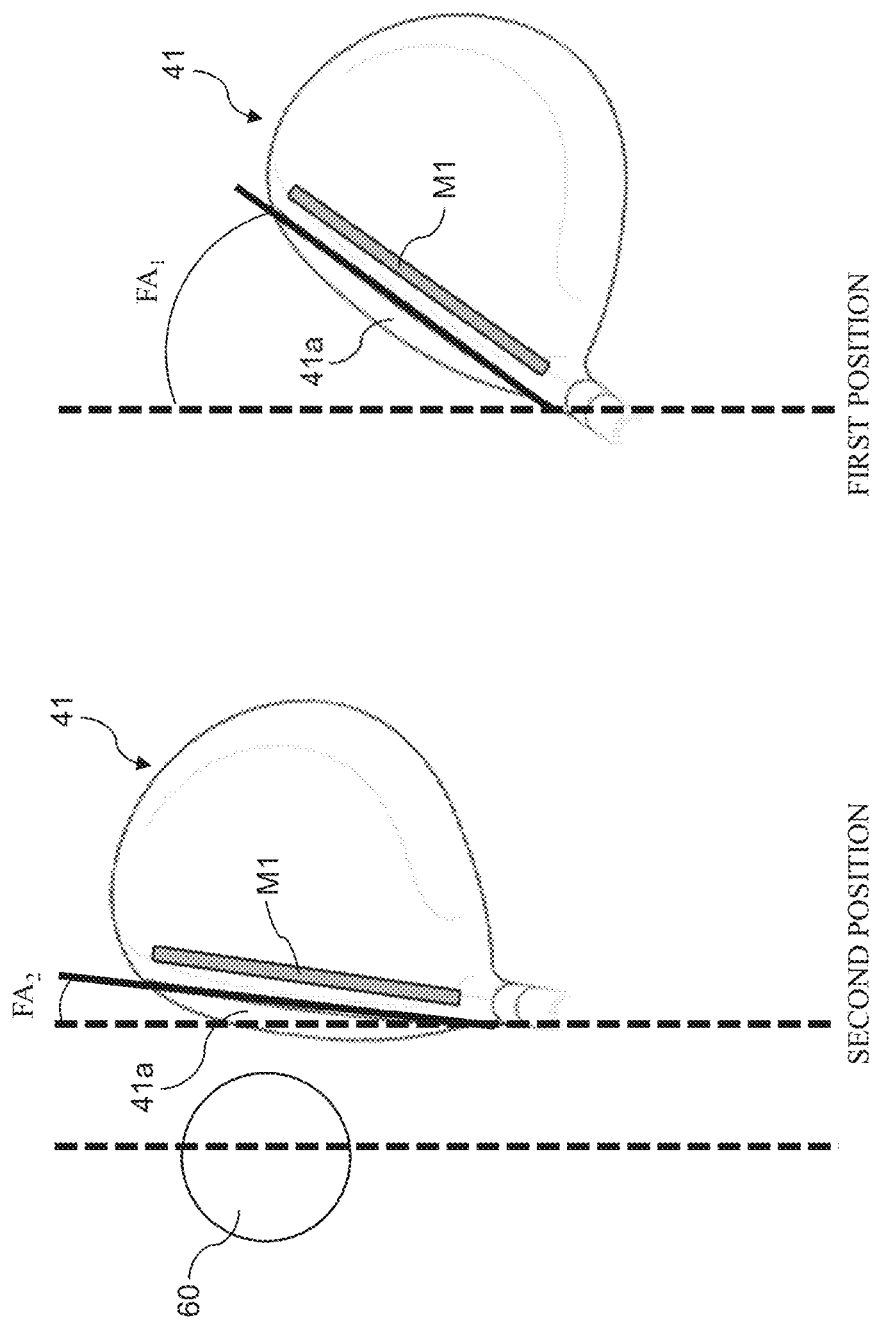
FIG. 14 is a diagram illustrating an index representing the amount of change in the openness of the face surface of the head according to the third embodiment.

Next, indices for selecting the optimal balance according to the third embodiment will be described. As described above, according to the knowledge gained by the inventors of the present invention, the amount of change in the openness of the face surface 41a at the time of the swing action influences the optimal balance. Therefore, in the third embodiment, an index $C_{13}$ representing the amount of change in the face angle is calculated as an index for selecting the optimal balance. The index $C_{13}$ is also an index $C_1$ representing the amount of change in the openness of the face surface 41a at the time of the swing action, similarly to the indices $C_{11}$ and $C_{12}$ according to the first and second embodiments. In the present embodiment, as shown in FIG. 14, a face angle $FA_1$ at a first position separated by a predetermined distance from the ball 60 at address and a face angle $FA_2$ at a second position that is closer to the ball 60 than the first position but still separated by a predetermined distance from the ball 60 are calculated, and the index $C_{13}$ is calculated as the difference $FA_1-FA_2$. The first position and the second position are both positions through which the test club 4 passes immediately before impact.

In the present embodiment, the index $C_{13}$ is calculated by image processing the measurement data, which is image data shot by the camera system 5. As shown in FIG. 14, in the present embodiment, a band-shaped marker M1 is stuck on the crown part of the head 41 in alignment with the face surface 41a, so as to easily perceive the face angle. The marker M1 is formed with a material that efficiently reflects the light from the strobes 53 and 54. Accordingly, the region of the marker M1, or in other words, the band-shaped region aligned with the face surface 41a in a plan view of the head 41, appears clearly in the images shot by the cameras 51 and 52. The calculation unit 24B extracts the image of the marker M1 in the two images (images at the first position and second position) shot at the timing of light emission of the strobes 53 and 54 immediately before impact that are stored in the storage unit 23. The calculation unit 24B then calculates the face angles $FA_1$ and $FA_2$, based on the images of the marker M1, and calculates index $C_{13}=FA_1-FA_2$.

The inventors of the present invention conducted testing that involved getting 27 test subjects to take practice hits with two golf clubs, namely, the abovementioned normal club and light balance club. The inventors then calculated the index $C_{13}$ when each of the 27 test subjects took practice hits with the normal club using a similar measurement device and measurement method to those described above. Also, the club with the better shot results, out of the above two golf clubs, was specified for each of the 27 test subjects. The quality of the shot results was evaluated similarly to the first embodiment. FIG. 15 is a table summarizing the result of this evaluation. From the testing results shown in this table, it was confirmed that the normal club tends to be more suitable for golfers for whom the index $C_{13}$ is small, and the light balance club tends to be more suitable golfers for whom this index $C_{13}$ is large. Note that, in FIG. 15, a background color is given to results that deviate from the above tendency, with the threshold value for judging the magnitude of the index $C_{13}$ set to 6 deg. According to the testing results, the above tendency appeared in 24 out of 27 test subjects, that is, at a probability of over 88%. Therefore, it was found that the optimal balance can be determined, as long as the index $C_{13}$ representing the amount of change in the openness of the face surface is known.

The fitting processing according to the third embodiment proceeds as shown in FIG. 4, similarly to the first embodiment. Based on the above knowledge, in step S6, the calculation unit 24B calculates the index $C_{13}$, however, rather than the indices $C_{11}$ and $C_{12}$, as an index $C_1$ representing the amount of change in the openness of the face surface 41a, based on measurement data stored in the storage unit 23.

In the following step S7, the selection unit 24C selects the optimal balance, according to the magnitude of the index $C_{13}$. More specifically, the selection unit 24C selects a lighter optimal balance as the index $C_{13}$ increases. At this time, the selection unit 24C compares the index $C_{13}$ with one threshold value determined in advance or a plurality of threshold values determined stepwise, judges which of ranges bounded by the one or more threshold values the index $C_{13}$ belongs to, and selects a lighter optimal balance as the values of the range to which the index $C_{13}$ belongs increase. Steps S8 and S9 after the optimal balance has been selected are similar to the first embodiment.

4. Variations

Although a number of embodiments of the present invention have been described above, the present invention is not limited to the above embodiments, and various modifications that do not depart from the gist of the invention can be made. For example, the following modifications can be made. Also, the substance of the following variations can be combined as appropriate.

4-1

In the above embodiments, the inertia sensor unit 1 and/or the camera system 5 are used as a measurement device for measuring the swing action. However, the configuration of the measurement device is not limited thereto and can be modified as appropriate. For example, a three-dimensional motion capture system, a distance image sensor or the like may be used, or a plurality of types of measurement devices may be selected as appropriate from those illustrated here or from other measurement devices, and the selected measurement devices may be used in combination.

4-2

In the above embodiments, in step S9, information specifying the optimal club, information on the optimal balance, information on the optimal stiffness and information on the optimal weight are all displayed on the display unit 21, but a configuration may be adopted in which only some thereof is displayed. For example, in the case where only information on the optimal balance, optimal stiffness and optimal weight is displayed, a salesperson of golf clubs, an instructor or the like who views this information may search catalogs and the like for a golf club that matches the optimal balance, optimal stiffness and optimal weight, and recommend the matching golf club to the golfer G. Note that in the case where information specifying the optimal club is not displayed in step S9, step S8 can be omitted. At least one of steps S3, S5 and S7 (S71) can also be omitted, in addition to step S8. In this case, by displaying the indices $A_1$, $B_1$ and $C_1$ and the preliminary index as appropriate in step S9, people can also perform the omitted steps, while referring to information prepared in advance that represents the relationship between these indices and the optimal specifications.

Also, the selection unit 24C may derive a customization method for customizing a specific golf club matching the conditions of the optimal weight and optimal stiffness so as to achieve the optimal balance, and the display control unit 24D may display the derived customization method on the display unit 21. For example, the amount of weight to be attached to the grip, head or the like of a golf club matching the conditions of the optimal weight and optimal stiffness may be calculated, in order to achieve the optimal balance, while displaying information specifying the type of shaft and head constituting this golf club, and the calculated weight may be displayed as the customization method.

4-3

The abovementioned indices $C_1$ representing the amount of change in the openness of the face surface 41a at the time of the swing action are illustrative examples, and can be modified as appropriate. For example, the following index $C_{11}'$ can also be used instead of the index $C_{11}$, and the following index $C_{12}'$ can also be used instead of the index $C_{12}$. Furthermore, the start point and end point of the integration interval of $C_{12}$ and $C_{11}'$ can also be set to a timing other than top and impact, and the timing of the angular velocity at which the difference between $C_{11}$ and $C_{12}'$ is taken can also be set to a timing other than top and impact.

$$C_{11}'=\int_{top}^{impact}|\omega_x|dt \qquad \text{Equation 5}$$

$$C_{12}'=|\omega_{x\_imp}-\omega_{x\_top}| \qquad \text{Equation 6}$$

Also, in the first embodiment, indices relating to $\omega_z$ such as $C_{11}$ and $C_{11}'$ and indices relating to $\omega_x$ such as $C_{12}$ and $C_{12}'$ need not be combined, and the optimal balance may be selected, according to only indices relating to either $\omega_z$ or $\omega_x$. In this case, however, it is desirable to use indices relating to $\omega_z$ which is more dominant with respect to the amount of change in the openness of the face surface 41a, similarly to the second embodiment.

Various indices $C_1$ were described above including the index $C_{13}$, but the optimal balance can be determined according to one or a combination these indices.

4-4

In the above embodiments, the arm output power $P_1$ was illustrated as a preliminary index that is used in combination with the indices $C_1$ in order to select the optimal balance, but other indices can also be used. For example, the optimal balance can also be determined, in the case where a preliminary index other than the arm output power $P_1$, such as the following, is combined with the indices $C_1$.

Club input power $P_2$

Energy (hereinafter, exertion energy) $E_1$ exerted by the golfer G during the swing action Torque (hereinafter, exertion torque) T exerted by the golfer G during the swing action The exertion energy $E_1$ is a known index that is described in detail in JP 2017-170105A and the like, and can, for example, be defined as the workload that is exerted by the arms of the golfer G, or as the average workload that is exerted on average per unit time by the arms of the golfer G. The workload of the arms can, for example, be calculated as an integrated value obtained by integrating a work rate $E_1'$ of the arms such as shown below for a predetermined period (e.g., from the time at top to the time at which the work rate $E_1'$ of the arms changes from positive to negative after top), and the average workload of the arms can be calculated as a value obtained by dividing such an integrated value by the length of the integration interval.

$$E_1'=R_2v_g^T+T_{g1}\omega_1-T_{g2}\omega_1 \qquad \text{Equation 7}$$

The exertion torque T is also a known index that is described in detail in JP 2017-170105A and the like, and can, for example, also be defined as an integrated value obtained by integrating the torque about the shoulder of the golfer G for a predetermined period (e.g., from top to impact), or can be defined as a value obtained by dividing this integrated value by the length of the integration interval, that is, as an average torque about the shoulder that is exerted on average per unit time.

Various preliminary indices were described above, and the optimal balance can be determined, by combining one or more of these preliminary indices with an arbitrary one or more of the abovementioned indices $C_1$ as appropriate.

4-5

In step S3 of the abovementioned embodiments, the optimal shaft weight was calculated as the optimal weight, but the weight of the entire golf club (hereinafter, also referred to as optimal club weight) suitable for the golfer G may be calculated instead of or in addition to the optimal shaft weight.

Also, in step S3, the moment of inertia (hereinafter, also referred to as optimal MI) of a golf club suitable for the golfer G may be calculated instead of or in addition to the optimal weight. In this case, in step S9, a golf club that matches the conditions of the optimal MI, as one of the optimal specifications, is selected. A swing moment of inertia $I_S$, a moment of inertia $I_G$ about the grip end, and a moment of inertia $I_2$ about the center of gravity of the golf club can be given as examples of the moment of inertia referred to here. Note that the swing moment of inertia $I_S$ is the moment of inertia about the shoulder of the golfer G during the swing action, as also disclosed in JP 2017-170105A and the like, and can, for example, be defined as in the following equation.

$$I_S=I_2+m_2(R+L)^2+I_1+m_1(R/2)^2$$

Also, for each golfer G, the weight of the arms is the same even if the golf club changes. Accordingly, the swing moment of inertia $I_S$ can also be defined as in the following equation, omitting the rotational moment of inertia of the arms.

$$I_S=I_2+m_2(R+L)^2$$

Note that $m_1$ is the mass of the arms, $m_2$ is the mass of the golf club, R is the length of the arms of the golfer G, L is the distance from the grip end to the center of gravity of the golf club, and $I_1$ is the moment of inertia about the center of gravity of the arms of the golfer G.

4-6

The arm output power $P_1$ can also be used as an index $A_1$ for selecting not only the optimal shaft weight but also the optimal club weight and the optimal MI. Also, the various preliminary indices illustrated in Variation 4-4 can also be used as indices $A_1$ for selecting not only the optimal shaft weight but also the optimal club weight and the optimal MI. JP 2017-170105A and the like can be referred to for more detail.

4-7

In the abovementioned embodiments, flexural stiffness is evaluated as the stiffness of the shaft, but torsional stiffness may be evaluated instead. The value of torsional stiffness (hereinafter, also referred to as the GJ value) can also be evaluated at a plurality of positions in the direction in which the shaft extends. That is, the distribution of torsional stiffness at a plurality of positions in the direction in which the shaft extends may be taken as the stiffness of the shaft. In this case, arbitrary indices whose correlation with the optimal GJ value is recognized can be used as the predetermined indices $B_1$ for selecting the optimal stiffness (i.e., the optimal GJ value which is the GJ value suitable for the golfer G). As such indices, the following indices, such as described in JP 2014-212862, can be used, for example.

(1) The magnitude of the amount of change in the grip angular velocity $\omega_x$ per unit time from the time at which the grip angular velocity $\omega_y$ is at a maximum to impact.

(2) The amount of change in the grip angular velocity $\omega_z$ near the top.

(3) The magnitude of the amount of change in the grip angular velocity $\omega_z$ from top to when the grip angular velocity $\omega_y$ is at a maximum during the downswing.

In this variation, the optimal GJ value can be similarly determined from indices $B_1$ that are based on measurement data, by calculating an approximation equation representing the relationship between the indices $B_1$ and the optimal GJ value through testing in advance, and storing the calculated approximation equation in the storage unit 23.

Also, a configuration may be adopted in which the flex, kick point or torque of the shaft suitable for the golfer G is determined as the optimal stiffness, rather than the stiffness distribution at a plurality of positions along the shaft suitable for the golfer G. Note that flex is an index for evaluating the hardness (flexural stiffness) of the entire shaft, and torque is an index for evaluating the torsional stiffness of the entire shaft. The method of deriving the flex (optimal flex) suitable for the golfer G is not particularly limited, and can, for example, be calculated from the abovementioned optimal EI value. For example, the optimal EI value at a specific position can also be set as the optimal flex, or the average value of the optimal EI values at a plurality of positions can also be set as the optimal flex. The torque (optimal torque) suitable for the golfer G can also be similarly calculated as appropriate from the optimal GJ value, and the kick point (optimal kick point) suitable for the golfer G can also be similarly calculated as appropriate from the optimal EI value and optimal GJ value.

4-8

In the abovementioned embodiments, steps S4 and S5 may be omitted, and, in step S8, a golf club that matches only the conditions of the optimal weight and optimal balance may be selected as the optimal club.

LIST OF REFERENCE NUMERALS

100, 200 Fitting system
1 Inertia sensor unit (measurement device)
2, 102 Fitting apparatus
24A Acquisition unit
24B Calculation unit
24C Selection unit
24D Display control unit
3 Fitting program
4 Test club
40 Shaft
41 Head
42 Grip
5 Camera system (measurement device)
G Golfer

The invention claimed is:

1. A fitting apparatus comprising:
an acquisition unit configured to acquire measurement data obtained by measuring a swing action of a test club by a golfer with a measurement device;
a calculation unit configured to calculate one or more first indices representing an amount of change during the swing action in an openness of a face surface of a head included in the test club at a time of the swing action, and calculate one or more second indices representing a characteristic of the swing action, different from the one or more first indices, based on the measurement data;
an input unit configured to receive operations by a user;
a selection unit configured to select a balance of a golf club suitable for the golfer, according to the one or more first indices, select at least one of a weight and a moment of inertia of a golf club suitable for the golfer, according to the one or more second indices, and select a golf club matching a condition of the balance and a condition of the at least one of the weight and the moment of inertia; and
a display unit configured to display information specifying the selected golf club,
wherein the selection unit is configured to:
receive input of information specifying a type of head, from the user via the input unit, and
select at least one of a weight of a shaft with a grip and a moment of inertia of a shaft of the golf club suitable for the golfer, according to at least one of a predetermined shaft information corresponding to the specified type of head and a predetermined information for determining moment of inertia of a shaft corresponding to the specified type of head, in addition to the one or more second indices.

2. The fitting apparatus according to claim 1, wherein the calculation unit is configured to calculate the one or more first indices, based on angular velocity data, included in the measurement data, about an axis approximately parallel to a shaft of the test club.

3. The fitting apparatus according to claim 1, wherein the calculation unit is configured to calculate the one or more first indices, based on angular velocity data, included in the measurement data, about an axis approximately parallel to a toe-heel direction of the test club.

4. The fitting apparatus according to claim 2, wherein the angular velocity data is data measured by an angular velocity sensor included in the measurement device and attached to the test club.

5. The fitting apparatus according to claim 1,
wherein the calculation unit is configured to acquire one or more preliminary indices representing a characteristic of the swing action, different from the one or more first indices, based on the measurement data, and
the selection unit is configured to select the balance, according to the one or more preliminary indices in addition to the one or more first indices.

6. The fitting apparatus according to claim 5, wherein the one or more preliminary indices include at least one of an index indicating power output by an arm of the golfer at the time of the swing action, an index indicating power input to the test club at the time of the swing action, an index indicating energy exerted by the golfer at the time of the swing action, and an index indicating a torque exerted by the golfer at the time of the swing action.

7. The fitting apparatus according to claim 1, wherein the one or more second indices includes at least one of an index indicating power output by an arm of the golfer at the time of the swing action, an index indicating power input to the test club at the time of the swing action, an index indicating energy exerted by the golfer at the time of the swing action, and an index indicating torque exerted by the golfer at the time of the swing action.

8. The fitting apparatus according to claim 1,
wherein the calculation unit is configured to calculate one or more third indices representing a characteristic of the swing action, different from the one or more first indices and the one or more second indices, based on the measurement data, and
the selection unit is configured to select a stiffness of a shaft suitable for the golfer, according to the one or more third indices.

9. The fitting apparatus according to claim 2, wherein the calculation unit is configured to calculate the one or more first indices, based on angular velocity data, included in the measurement data, about an axis approximately parallel to a toe-heel direction of the test club.

10. The fitting apparatus according to claim 2,
wherein the calculation unit is configured to acquire one or more preliminary indices representing a characteristic of the swing action, different from the one or more first indices, based on the measurement data, and the selection unit is configured to select the balance, according to the one or more preliminary indices in addition to the one or more first indices.

11. The fitting apparatus according to claim 3, wherein the calculation unit is configured to acquire one or more preliminary indices representing a characteristic of the swing action, different from the one or more first indices, based on the measurement data, and the selection unit is configured to select the balance, according to the one or more preliminary indices in addition to the one or more first indices.

12. The fitting apparatus according to claim 4, wherein the calculation unit is configured to acquire one or more preliminary indices representing a characteristic of the swing action, different from the one or more first indices, based on the measurement data, and the selection unit is configured to select the balance, according to the one or more preliminary indices in addition to the one or more first indices.

13. The fitting apparatus according to claim 2, wherein the one or more second indices includes at least one of an index indicating power output by an arm of the golfer at the time of the swing action, an index indicating power input to the test club at the time of the swing action, an index indicating energy exerted by the golfer at the time of the swing action, and an index indicating torque exerted by the golfer at the time of the swing action.

14. The fitting apparatus according to claim 3, wherein the one or more second indices includes at least one of an index indicating power output by an arm of the golfer at the time of the swing action, an index indicating power input to the test club at the time of the swing action, an index indicating energy exerted by the golfer at the time of the swing action, and an index indicating torque exerted by the golfer at the time of the swing action.

15. The fitting apparatus according to claim 4, wherein the one or more second indices includes at least one of an index indicating power output by an arm of the golfer at the time of the swing action, an index indicating power input to the test club at the time of the swing action, an index indicating energy exerted by the golfer at the time of the swing action, and an index indicating torque exerted by the golfer at the time of the swing action.

16. The fitting apparatus according to claim 5, wherein the one or more second indices includes at least one of an index indicating power output by an arm of the golfer at the time of the swing action, an index indicating power input to the test club at the time of the swing action, an index indicating energy exerted by the golfer at the time of the swing action, and an index indicating torque exerted by the golfer at the time of the swing action.

17. The fitting apparatus according to claim 6, wherein the one or more second indices includes at least one of an index indicating power output by an arm of the golfer at the time of the swing action, an index indicating power input to the test club at the time of the swing action, an index indicating energy exerted by the golfer at the time of the swing action, and an index indicating torque exerted by the golfer at the time of the swing action.

18. The fitting apparatus according to claim 2, wherein the calculation unit is configured to calculate one or more third indices representing a characteristic of the swing action, different from the one or more first indices and the one or more second indices, based on the measurement data, and the selection unit is configured to select a stiffness of a shaft suitable for the golfer, according to the one or more third indices.

19. A non-transitory computer readable medium storing a fitting program configured to cause a computer to execute:

acquiring measurement data obtained by measuring a swing action of a test club by a golfer with a measurement device;

calculating one or more first indices representing an amount of change during the swing action in an openness of a face surface of a head included in the test club at a time of the swing action, based on the measurement data;

calculating one or more second indices representing a characteristic of the swing action, different from the one or more first indices, based on the measurement data;

receiving an input of information specifying a type of head;

selecting a balance of a golf club suitable for the golfer, according to the one or more first indices;

selecting at least one of a weight and a moment of inertia of a golf club suitable for the golfer, according to the one or more second indices;

selecting a golf club matching a condition of the balance and a condition of the at least one of the weight and the moment of inertia; and displaying information specifying the selected golf club, wherein the selecting at least one of a weight and a moment of inertia of the golf club suitable for the golfer according to the one or more second indices includes selecting at least one of a weight of a shaft with a grip and a moment of inertia of a shaft of the golf club suitable for the golfer, according to at least one of a predetermined shaft determination information corresponding to the specified type of head and a predetermined information for determining moment of inertia of a shaft corresponding to the specified type of head, in addition to the one or more second indices.

20. A fitting method comprising:

acquiring measurement data obtained by measuring a swing action of a test club by a golfer, using a measurement device;

calculating one or more first indices representing an amount of change during the swing action in an openness of a face surface of a head included in the test club at a time of the swing action, based on the measurement data, using a computer;

calculating one or more second indices representing a characteristic of the swing action, different from the one or more first indices, based on the measurement data, using the computer;

inputting information specifying a type of head via an input unit that is connected to the computer;

selecting a balance of a golf club suitable for the golfer, according to the one or more first indices;

selecting at least one of a weight and a moment of inertia of a golf club suitable for the golfer, according to the one or more second indices; and recommending and displaying a golf club matching a condition of the balance and a condition of the at least one of the weight and the moment of inertia to the golfer, wherein the selecting at least one of a weight and a moment of inertia of the golf club suitable for the golfer according to the one or more second indices includes selecting at least one of a weight of a shaft with a grip and a moment of inertia of a shaft of the golf club suitable for the golfer, according to at least one of a predetermined shaft determination information corresponding to the specified type of head and a predetermined information for determining moment of inertia of a shaft corresponding to the specified type of head, in addition to the one or more second indices.

\* \* \* \* \*